US009484974B2

(12) United States Patent
Tu et al.

(10) Patent No.: US 9,484,974 B2
(45) Date of Patent: Nov. 1, 2016

(54) METHODS AND SYSTEMS FOR MULTI-LAYER PERCEPTRON BASED NON-LINEAR INTERFERENCE MANAGEMENT IN MULTI-TECHNOLOGY COMMUNICATION DEVICES

(71) Applicant: QUALCOMM Incorporated, San Diego, CA (US)

(72) Inventors: Sheng-Yuan Tu, San Diego, CA (US); Farrokh Abrishamkar, San Diego, CA (US); Parisa Cheraghi, Farnborough (GB); Insung Kang, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/849,528

(22) Filed: Sep. 9, 2015

(65) Prior Publication Data

US 2016/0072590 A1 Mar. 10, 2016

Related U.S. Application Data

(60) Provisional application No. 62/048,519, filed on Sep. 10, 2014, provisional application No. 62/106,749, filed on Jan. 23, 2015, provisional application No. 62/106,750, filed on Jan. 23, 2015.

(51) Int. Cl.
*H04B 15/00* (2006.01)
*H04B 1/40* (2015.01)
*H04B 1/525* (2015.01)

(52) U.S. Cl.
CPC ............. *H04B 1/40* (2013.01); *H04B 1/525* (2013.01); *H04B 15/00* (2013.01)

(58) Field of Classification Search
CPC ...................................................... H04B 15/00
See application file for complete search history.

(56) References Cited

U.S. PATENT DOCUMENTS 5,272,723 A 12/1993 Kimoto et al.
5,434,883 A * 7/1995 Kimoto ............ H04L 25/03165
333/18

(Continued)

OTHER PUBLICATIONS

Bouboulis P., et al., "Complex Support Vector Regression", Cognitive Information Processing (CIP), 2012 3rd International Workshop On, IEEE, May 28, 2012, pp. 1-6, XP032455211, DOI: 10.1109/CIP.2012.6232895 ISBN: 978-1-4673-1877-8 the whole document.

(Continued)

*Primary Examiner* — Tuan H Nguyen
(74) *Attorney, Agent, or Firm* — The Marbury Law Group, PLLC

(57) ABSTRACT

The various embodiments include methods and apparatuses for canceling nonlinear interference during concurrent communication of multi-technology wireless communication devices. Nonlinear interference may be estimated using a multilayer perceptron neural network with Hammerstein structure by dividing an aggressor signal into real and imaginary components, augmenting the components by weight factors, executing a linear combination of the augmented components, and executing a nonlinear sigmoid function for the combined components at a hidden layer of multilayer perceptron neural network to produce a hidden layer output signal. At an output layer, hidden layer output signals may be augmented by weight factors, and the augmented hidden layer output signals may be linearly combined to produce real and imaginary components of an estimated jammer signal. A linear filter function may be executed for the components of the jammer signal, and to produce a nonlinear interference estimate used to cancel the nonlinear interference of a victim signal.

30 Claims, 13 Drawing Sheets

(56) References Cited

U.S. PATENT DOCUMENTS

| | | | |
|---|---|---|---|
| 6,131,013 | A | 10/2000 | Bergstrom et al. |
| 6,636,561 | B1 | 10/2003 | Hudson |
| 6,754,293 | B1 | 6/2004 | Henriksson et al. |
| 2011/0125686 | A1 | 5/2011 | Al-Duwaish et al. |
| 2012/0002712 | A1 | 1/2012 | Hayami et al. |
| 2012/0099636 | A1 | 4/2012 | Ki et al. |
| 2012/0140860 | A1 | 6/2012 | Rimini et al. |
| 2013/0044791 | A1 | 2/2013 | Rimini et al. |
| 2014/0086162 | A1* | 3/2014 | Rimini ............... H04B 1/10 370/329 |
| 2014/0213210 | A1 | 7/2014 | Li et al. |
| 2015/0036621 | A1 | 2/2015 | Shin |
| 2016/0071003 | A1 | 3/2016 | Abrishamkar et al. |
| 2016/0071007 | A1 | 3/2016 | Tu |
| 2016/0071008 | A1 | 3/2016 | Tu |
| 2016/0071009 | A1 | 3/2016 | Abrishamkar |
| 2016/0072531 | A1 | 3/2016 | Abrishamkar |
| 2016/0072543 | A1 | 3/2016 | Abrishamkar |
| 2016/0072591 | A1 | 3/2016 | Tu |
| 2016/0072592 | A1 | 3/2016 | Tu |
| 2016/0072649 | A1 | 3/2016 | Tu |

OTHER PUBLICATIONS

Bousquet O., et al., "Kernel Methods and their Applications to Signal Processing", Proceedings of International Conference on Acoustics, Speech and Signal Processing (ICASSP'03) Apr. 6-10, 2003 Hong Kong, China, [IEEE International Conference on Acoustics, Speech, and Signal Processing (ICASSP)], IEEE, 2003 IEEE International Confe, vol. 4, Apr. 6, 2003, pp. IV 860-IV 863, XP010641296, DOI: 10.1109/ICASSP.2003.1202779 ISBN: 978-0-7803-7663-2 the whole document.

Cha I., et al., "Channel Equalization using Adaptive Complex Radial Basis Function Networks", IEEE Journal on Selected Areas in Communications, IEEE Service Center, Piscataway, US, vol. 13, No. 1, Jan. 1, 1995, pp. 122-131, XP000492750, ISSN: 0733-8716, DOI: 10.1109/49.363139.

Cha I., et al., "Interference Cancellation using Radial Basis Function Networks," Statistical Signal and Array Processing, 1992. Conference Proceedings. , IEEE Sixth Sp Workshop on Victoria, BC, Canada Oct. 7-9, 1992, New York, NY, USA,IEEE, US, Oct. 7, 1992, pp. 221-224, XP010057404, DOI: 10.1109/SSAP.1992. 246809 ISBN: 978-0-7803-0508-3.

Choi S., et al., "A Quadratic Sigmoid Neural Equalizer for Nonlinear Digital Magnetic Recording Channels", IEEE Communications Letters, IEEE Service Center, Piscataway, NJ, US, vol. 2, No. 9, Sep. 1, 1998, pp. 263-265, XP011423366, ISSN: 1089-7798, DOI: 10.1109/4234.718497.

Ghadjati M., et al., "Communication Channel Equalization based on Levenberg-Marquardt trained Artificial Neural Networks", 3rd International Conference on Systems and Control, IEEE, Oct. 29, 2013, pp. 856-861, XP032572604, 001: 10.1109/ICOSC.2013. 6750957.

Guha D.R., et al., "Novel Approach to Cochannel Interference Mitigation Using Wilcoxon Generalized Radial Basis Function Network," India Conference (INDICON), 2009 Annual IEEE, IEEE, Piscataway, Nj, USA, Dec. 18, 2009, pp. 1-4, XP031625306, ISBN: 978-1-4244-4858-6.

Haykin S., "Adaptive Digital Communication Receivers", IEEE Communications Magazine, IEEE Service Center, Piscataway, US, vol. 38-12, Dec. 1, 2000, pp. 106-114, XP011091397, ISSN: 0163-6804.

International Search Report and Written Opinion—PCT/US2015/049362—ISA/EPO—Nov. 11, 2015.

Kassam S.A., et al., "Radial Basis Function Networks in Nonlinear Signal Processing Applications", Signals, Systems and Computers, 1993, 1993 Conference Record of the Twenty-Seventh Asilornar Conference on Pacific Grove, CA, USA Nov. 1, 1993, Los Alamitos, CA, USA, IEEE Comput. Soc, Nov. 1, 1993, pp. 1021-1025, XP010096246, DOI: 10.1109/ACSSC.1993.342415 ISBN: 978-0-8186-4120-6.

Laster, D. et al: "Interference Rejection in Digital Wireless Communications", IEEE Signal Processing Magazine, IEEE Service Center, Piscataway, NJ, US, vol. 14, No. 3. May 1997, pp. 37-62, XP0110899773, ISSN: 1053-5688 p. 39, p. 46-p. 4.

Machado R.J., "Multi-model Neural Network for Image Classification", Cybernetic Vision, 1996, Proceedings., Second Workshop on Sao Carlos, Brazil Dec. 9-11, 1996, Los Alamitos, CA, USA,IEEE Comput. Soc. US, Dec. 9, 1996, pp. 57-59, XP010251580, ISBN: 978-0-8166-8058-8.

Nayak D R: "Blind Radial Basis Function Network Equalizer for Digital Communication Channels". Computer Modeling and Simulation, 2009. EMS '09. Third Uksim European Symposium On, IEEE, Piscataway, NJ, USA, Nov. 25, 2009, pp. 219-224, XP031583980, ISBN: 978-1-4244-5345-0 abstract.

Peng M., et al., "Adaptive Equalization with Neural Network Multi-Layer Perceptron Structure and Their Evaluation," IEEE, Department of Electrical and Computer Engineering, Northeastern University, Boston, MA 02115, USA, Mar. 23-26, 1992 pp. II-301-to-II304.

Sheeja K.L., "Decision Feedback Equalization USIN RBF and MLP Networks," Department of Electrical Engineering, NIT Rourkela, IEEE, Dec. 9-11, 2010, pp. 96-101.

Sicuranza G.L., et al., "On the Accuracy of Generalized Hammerstein Models for Nonlinear Active Noise Control," IEEE Instrumentation and Measurement Technology Conference (IEEE Cat. No. 06CH377140)IMTC. IEEE, Apr. 1, 2005, pp. 1411-1416. XP031056931. DOI: 10.1109/IMTC.2006.235393 ISBN: 978-0-7803-9359-2.

Xu W., et al., "Subspace Adaptive Filtering Techniques for Multi-sensor DS-CDMA Interference Suppression", Signals, Systems & Computers, 1998. Conference Record of the Thirty-Second Asilomar Conference on Pacific Grove, CA, USA Nov. 1-4, 1998, Piscatawany, NJ, USA,IEEE, US, Nov. 1, 1998, pp. 551-555 vol. 1, XP032135895, DOI: 10.1109/ACSSC.1998.750924 ISBN: 978-0-7803-5148-6.

Cichocki A., et al., "Nonlinear Interference Cancellation Using Neural Networks," Brain Science Institute, Accessed web page on May 20, 2014, URL: http://www.google.co.in/url?sa=t&rct=j&q=&esrc=s&source=web&cd=2&cad=rja&uact=8&ved=0CC8QFjAB&url=http%3A%2F%2Fwww.researchgate.net%2Fpublication%2F2315868_Nonlinear_Interference_Cancellation_Using_Neural_Networks%2Ffile%2Fe0b495254345f676f4.

* cited by examiner

METHODS AND SYSTEMS FOR MULTI-LAYER PERCEPTRON BASED NON-LINEAR INTERFERENCE MANAGEMENT IN MULTI-TECHNOLOGY COMMUNICATION DEVICES

RELATED APPLICATIONS

This application claims the benefit of priority under 35 U.S.C. §119(e) of U.S. Provisional Application No. 62/048,519 entitled "Multilayer Perceptron For Dual SIM Dual Active Interference Cancellation" filed Sep. 10, 2014, U.S. Provisional Application No. 62/106,749 entitled "Universal NLIC MLP with Hammerstein Structure for LTE Carrier Aggregation" filed on Jan. 23, 2015, and U.S. Provisional Application No. 62/106,750 entitled "Universal NLIC Using Linear, Non-Linear, Multi-Model Multi-Layer Perceptron Hammerstein for LTE Carrier Aggregation" filed on Jan. 23, 2015, the entire contents of all of which are hereby incorporated by reference.

BACKGROUND

Some wireless communication devices—such as smart phones, tablet computers, laptop computers, and routers—contain hardware and/or software elements that provide access to multiple wireless communication networks simultaneously. For example, a wireless communication device can have one or more radio frequency communication circuits (or "RF chains") for accessing one or more wireless local area networks ("WLANs"), wireless wide area networks ("WWANs"), and/or global positioning systems ("GPS"). When multiple reception ("Rx") and/or transmission ("Tx") operations are implemented simultaneously, i.e., co-exist, on a wireless communication device, these operations may interfere with each other.

SUMMARY

The methods and apparatuses of various embodiments provide circuits and methods for managing interference in a multi-technology communication device. Embodiment methods may include receiving an aggressor signal at the multi-technology communication device, dividing the aggressor signal into a real aggressor signal component and an imaginary aggressor signal component, augmenting the real and imaginary aggressor signal components with a weight factor at a hidden layer of a multilayer perceptron neural network, executing a first linear combination of the real and imaginary aggressor signal components at the hidden layer, executing a nonlinear sigmoid function for the combined real and imaginary aggressor signal components at the hidden layer to produce a hidden layer output signal, augmenting a plurality of hidden layer output signals each with a weight factor at an output layer of the multilayer perceptron neural network, executing a second linear combination of the augmented plurality of hidden layer output signals at the output layer to produce a real output layer output signal and an imaginary output layer output signal, and executing a linear filter function on the real and imaginary output layer output signals to produce an estimated real nonlinear interference and an estimated imaginary nonlinear interference.

Some embodiments may include combining the estimated real and estimated imaginary nonlinear interference to produce an estimated nonlinear interference, determining an error of the estimated nonlinear interference, determining whether the error of the estimated nonlinear interference exceeds an efficiency threshold, and canceling the estimated nonlinear interference from a victim signal.

In some embodiments, canceling the estimated nonlinear interference from a victim signal may include canceling the estimated nonlinear interference from the victim signal in response to determining that the error of the estimated nonlinear interference does not exceed the efficiency threshold. The methods may further include training weight factors to reduce an error of the estimated nonlinear interference in response to determining that the error of the estimated nonlinear interference exceeds the efficiency threshold.

In some embodiments, training weight factors to reduce an error of the estimated nonlinear interference may include using a Gauss-Newton algorithm to train the weight factors.

Some embodiments may include selecting the weight factors to reduce an error of the estimated nonlinear interference.

In some embodiments, selecting the weight factors to reduce an error of the estimated nonlinear interference may include selecting the weight factors used for a previous determination of a previous estimated nonlinear interference for a previous victim signal within a predetermined time period.

In some embodiments, the linear filter function may be a finite impulse response filter. In some embodiments, the linear filter function may have a Hammerstein structure.

In some embodiments, dividing the aggressor signal into a real aggressor signal component and an imaginary aggressor signal component may include generating an aggressor kernel such that the real aggressor signal component is a real aggressor kernel component and the imaginary aggressor signal component is an imaginary aggressor kernel component. In some embodiments, the aggressor kernel may be a set of non-linear inputs derived from the received aggressor signal.

In some embodiments, executing a first linear combination of the real and imaginary aggressor signal components at the hidden layer may include executing a linear combination of the real and imaginary aggressor signal components and a bias factor at the hidden layer. In some embodiments, executing a second linear combination of the augmented hidden layer output signals at the output layer to produce a real output layer output signal and an imaginary output layer output signal may include executing a linear combination of the augmented hidden layer output signals and a bias factor at the output layer.

In some embodiments, executing a linear filter function on the real and imaginary output layer output signals to produce an estimated real nonlinear interference and an estimated imaginary nonlinear interference may include augmenting the real and imaginary output layer output signals each with a weight factor at a plurality of instances corresponding to a number of taps of the linear filter function. A third linear combination of the augmented real output layer output signals may be executed to produce the estimated real nonlinear interference. A fourth linear combination of the augmented imaginary output layer output signals may be executed to produce the estimated imaginary nonlinear interference.

Embodiments include a multi-technology communication device having an antenna that receives an aggressor signal at the multi-technology communication device, and a processor communicatively connected to the antenna and configured with processor-executable instructions to perform operations of one or more of the embodiment methods described above.

Embodiments include a multi-technology communication device having means for performing functions of one or more of the embodiment methods described above.

Embodiments include a non-transitory processor-readable medium having stored thereon processor-executable software instructions to cause a processor to perform operations of one or more of the embodiment methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
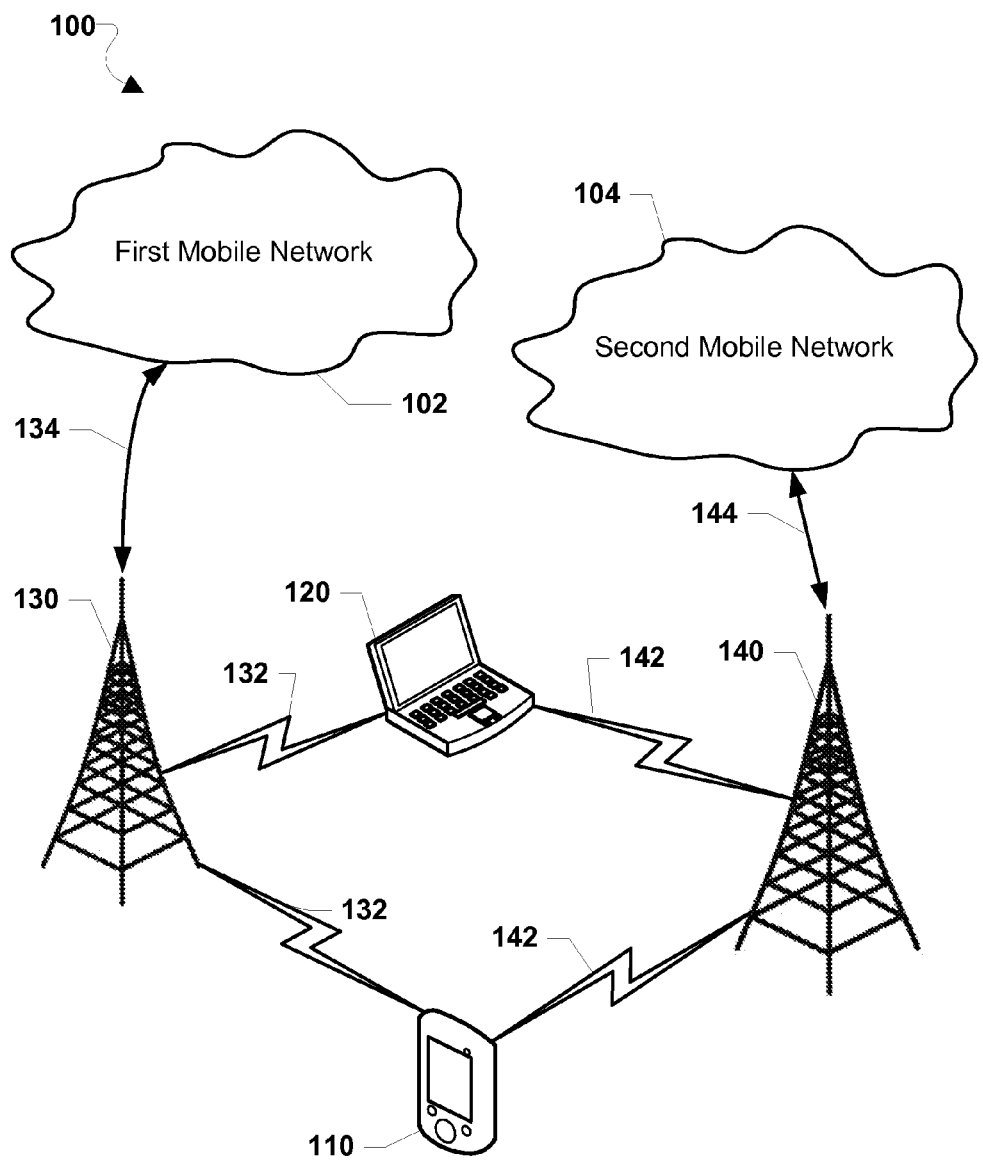
FIG. 1 is a communication system block diagram illustrating a network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims or the claims.

The word "exemplary" is used herein to mean "serving as an example, instance, or illustration." Any implementation described herein as "exemplary" is not necessarily to be construed as preferred or advantageous over other implementations.

The terms "computing device," "mobile device," and "wireless communication device" are used interchangeably herein to refer to any one or all of cellular telephones, smartphones, personal or mobile multi-media players, personal data assistants (PDAs), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor and wireless communication circuitry. As used herein, the terms "multi-technology communication device" and "multi-technology communication device" refer to a wireless communication device that supports access to at least two mobile communication networks. While the various embodiments are particularly useful for mobile devices, such as smartphones, the embodiments are generally useful in any electronic device that implements radio hardware in close proximity to other hardware.

Descriptions of the various embodiments refer to multi-technology communication devices for exemplary purposes. However, the embodiments may be suitable for any multiple-technology (multi-technology) wireless communication device that may individually maintain a plurality of connections to a plurality of mobile networks through one or more radio communication circuits. For example, the various embodiments may be implemented in multi-SIM multi-active devices of any combination of number of subscriber identity modules (SIM) and concurrently active subscriptions. Moreover, a SIM may not be required for a wireless communication device to implement the various embodiments, which may apply to any form of wireless communication.

In a wireless communication device with multiple RF chains, the antennas of the RF chains may be in close proximity to each other. This close proximity may cause one RF chain to desensitize or interfere with the ability of another during the simultaneous use of the RF chains. Receiver desensitization ("desense"), or degradation of receiver sensitivity, may result from noise interference of a nearby transmitter. In particular, when two radios are close together with one transmitting on the uplink (the "aggressor") and the other receiving on the downlink (the "victim"), signals from the transmitter may be picked up by the receiver or otherwise interfere with reception of a weaker signal (e.g., from a distant base station). As a result, the received signals may become corrupted and difficult or impossible for the victim to decode. In particular, desense of received signals presents a design and operational challenge for multi-radio devices due to the proximity of transmitter and receiver.

Multi-technology devices enable a user to connect to different mobile networks (or different accounts on the same network) while using the same multi-technology communication device. For example, a multi-technology communication device may connect to GSM, TDSCDMA, CDMA2000, WCDMA and other radio frequency networks. In the various embodiments, multi-technology communication devices may also include two RF chains so that each network communication supported by each RF chain can be accomplished concurrently.

However, multi-technology devices can suffer from interference between two communications being accomplished concurrently, such as when one communication session is transmitting ("Tx") at the same time as another communication session is attempting to receive ("Rx"). As used herein, the term "victim" refers to the communication service or subscription suffering from interference at a given instant, and the term "aggressor" refers to the communication service or subscription whose Rx or Tx actions are causing the interference. In an example multi-technology communication device, the victim may be attempting to receive RF signals from a network while the aggressor attempts to transmit RF signals to another network. In an example of such interference, an aggressor's transmissions may de-sense the victim's reception, in which case the victim may receive the aggressor's transmissions that act as noise and interfere with the victim's ability to receive wanted RF signals.

In multi-technology communication devices, an aggressor's transmissions may cause severe impairment to the victim's ability to receive transmission. This interference may be in the form of blocking interference, harmonics, intermodulation, or other noises and distortion. Such interference may significantly degrade the victim's receiver sensitivity, link to a network, voice call quality and data throughput. These effects may result in a reduced network capacity for the affected communication service or subscription. The aggressor's transmission may also cause receiver sensitivity of the victim signal that is drastically degraded, resulting in call quality degradation, higher rates for call drops and radio link failures, and data throughput degradation, which may potentially cause the victim to lose a data connection.

Nonlinear signals of the RF chains may be to blame for desense of received signals. Often the Tx/aggressor signal frequency is a fraction of the Rx/victim signal frequency. However, multiple aggressor signals may constructively combine to form a harmonic aggressor signal to the victim signal. The harmonic aggressor signal may be strong enough to cause nonlinear interference of the victim signal.

In order to recover information from the victim signal, various circuits and processing methods may be used to remove or subtract the interfering signals from the received victim signal. However, removing or subtracting nonlinear interference from a victim signal is particularly problematic for devices having multiple RF chain, such as multi-SIM multi-active ("MSMA") devices and for Long-Term Evolution ("LTE") carrier aggregation, because interference experienced on one RF chain may come from multiple RF sources and thus may have unpredictable signal form. Current techniques for removing nonlinear interference from a victim signal are case specific, requiring the communications device to have knowledge of the communication technology used for the transmission and reception of signals, and the kind of interference the aggressor signal is causing.

The various embodiments include methods for removing nonlinear interference from a victim signal in digital communications by using a neural network analysis method to estimate the coefficients of the signal to be removed before a received signal is decoded. In particular, the neural network may implement supervised learning using multilayer perceptrons with Hammerstein structure to dynamically estimate an interference of the aggressor signals on the victim signal to be removed from the victim signal so that it may be decoded. An absolute calculation of the nonlinear interference may be mathematically difficult. Accordingly, the various embodiments provide methods that may be implemented in cost effective circuits and processing algorithms to provide an effective estimate of the interference, which when subtracted from the victim signal results in significant improvement in the recovered signal.

In various embodiments, a mobile device may use the neural network method combined with a linear filter function to estimate a function of the nonlinear interference from a set of known aggressor reference signals and a victim reference signal without having to know the type of communication technology or type, source or form of interference. The set of aggressor reference signals may be obtained from the RF chain on the mobile device supporting the aggressor reference signals. The victim reference signal may be obtained from the RF chain on the mobile device supporting the victim reference signal. These known signals may be received by the neural network at an input layer. In various embodiments, the aggressor reference signal may be a complex signal that may be divided into one or more real and imaginary aggressor signals. In various embodiments, the aggressor reference signal may be used to generate a dominant kernel of aggressor signals, which may be divided into one or more real and imaginary aggressor kernels and received by the neural network at the input layer in place of the aggressor reference signal. From the input layer, the neural network may pass the aggressor reference signals to a hidden layer of the neural network. In passing these signals to nodes of the hidden layer, the aggressor reference signals may be augmented using weight factors. The augmented aggressor reference signals may be linearly combined for each node of the hidden layer and the result may be augmented by a nonlinear sigmoid function. An output of the hidden layer may be passed to an output layer. All of the outputs of the hidden layer may again be augmented by weight factors and linearly combined. An output of the output layer may be an estimation of a jammer signal distorting the victim signal. The output of the output layer may be passed to a linear filter function, which may augment the estimated jammer signal one or more times using varying weight factors and combine the results to produce an estimation of an estimated nonlinear interference, from which a function of the nonlinear interference may be determined. The estimated nonlinear interference may then be removed from a received victim signal.

In various embodiments, the weight factors used to estimate the function of the nonlinear interference may be trained using the victim reference signal and an estimated victim signal using the estimated nonlinear interference to calculate the error between the victim reference signal and the estimated victim signal. The trained weight factors may be updated in the neural network to increase the accuracy of the estimated nonlinear interference.

The various embodiments may be implemented in wireless communication devices that operate within a variety of communication systems 100, such as at least two mobile telephony networks, an example of which is illustrated in FIG. 1. A first mobile network 102 and a second mobile network 104 are typical mobile networks that include a plurality of cellular base stations 130 and 140. A first multi-technology communication device 110 may be in communication with the first mobile network 102 through a cellular connection 132 to a first base station 130. The first multi-technology communication device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144.

A second multi-technology communication device 120 may similarly communicate with the first mobile network 102 through a radio based communication connection such as a cellular connection 132 to a first base station 130. The second multi-technology communication device 120 may communicate with the second mobile network 104 through a radio communication connection such as a cellular connection 142 to the second base station 140. Cellular connections 132 and 142 may be made through two-way wireless communication links, such as 4G, 3G, CDMA, TDSCDMA, WCDMA, GSM, and other mobile telephony communication technologies. Other radio communication connections may include various other wireless connections, including WLANs, such as Wi-Fi based on IEEE 802.11 standards, and wireless location services, such as GPS. For example, the first wireless communications device may transmit and receive WiFi communications from a network resource such as a router. Similarly, the wireless communications device may transmit and receive wireless communications with multiple Bluetooth enabled devices such as peripheral devices (e.g., keyboards, speakers, displays) as well as the second wireless communications device. The transmission and receipt of wireless communications over any and all of these radio resources may result in desense on victim signals during overlapping periods of transmission.

Figure 2:
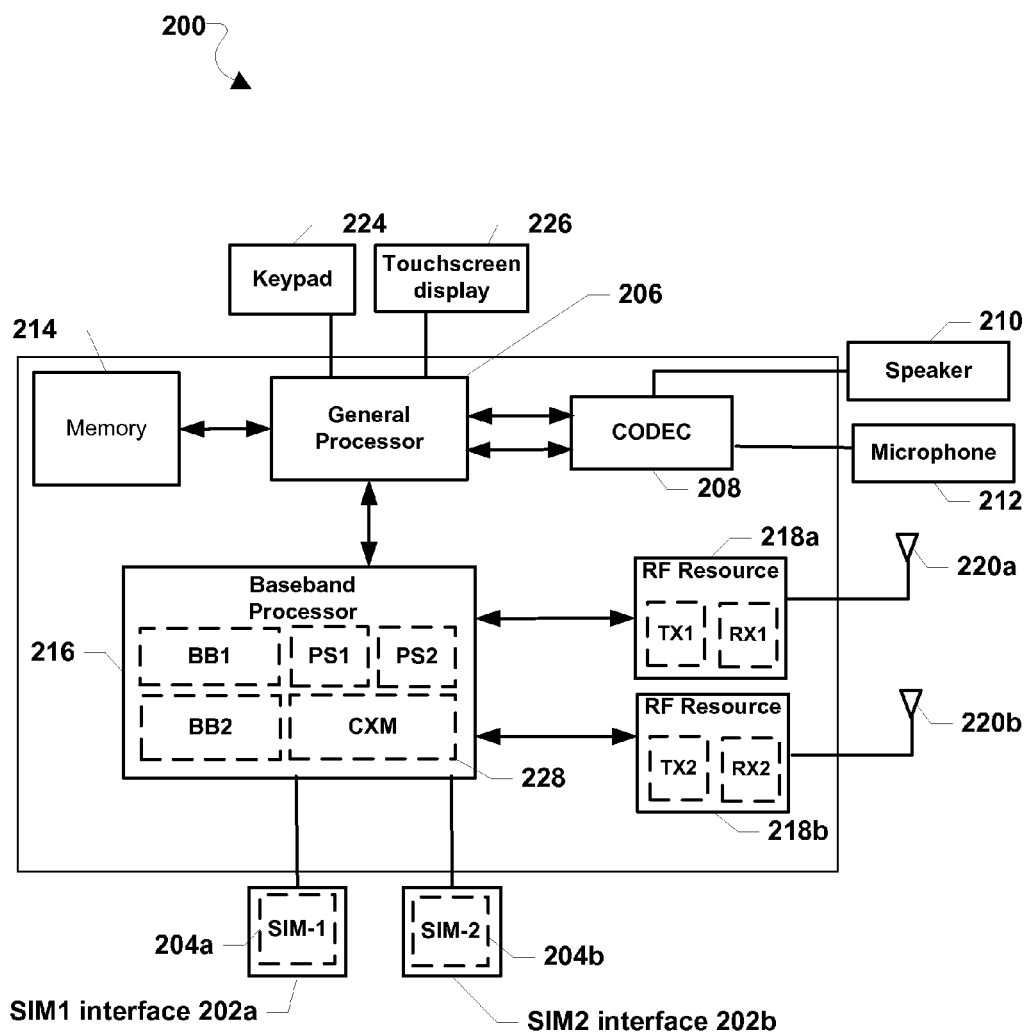
FIG. 2 is a component block diagram illustrating various embodiments of a multi-technology wireless communications device.

FIG. 2 illustrates various embodiments of a multi-technology communication device 200 (e.g., 110, 120 in FIG. 1) that are suitable for implementing the various embodiments. With reference to FIGS. 1 and 2, the multi-technology communication device 200 may include a first SIM interface 202a, which may receive a first identity module SIM-1 204a that is associated with a first subscription. The multi-technology communication device 200 may also include a second SIM interface 202b, which may receive a second identity module SIM-2 204b that is associated with a second subscription.

A SIM in the various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM may have a CPU, ROM, RAM, EEPROM and I/O circuits. A SIM used in the various embodiments may contain user account information, an international mobile subscriber identity (IMSI), a set of SIM application toolkit (SAT) commands and storage space for phone book contacts. A SIM may further store a Home Public-Land-Mobile-Network (HPLMN) code to indicate the SIM card network operator provider. An Integrated Circuit Card Identity (IC-CID) SIM serial number may be printed on the SIM for identification.

Each multi-technology communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain.

The memory 214 may store operating system (OS), as well as user application software and executable instructions. The memory 214 may also store application data, such as an array data structure.

The general purpose processor 206 and memory 214 may each be coupled to at least one baseband modem processor 216. Each SIM in the multi-technology communication device 200 (e.g., SIM-1 202a and SIM-2 202b) may be associated with a baseband-RF resource chain. Each baseband-RF resource chain may include the baseband modem processor 216 to perform baseband/modem functions for communications on a SIM, and one or more amplifiers and radios, referred to generally herein as RF resources 218a, 218b. In some embodiments, baseband-RF resource chains may interact with a shared baseband modem processor 216 (i.e., a single device that performs baseband/modem functions for all SIMs on the wireless device). Alternatively, each baseband-RF resource chain may include physically or logically separate baseband processors (e.g., BB1, BB2).

In some embodiments, the baseband modem processor 216 may be an integrated chip capable of managing the protocol stacks of each of the SIMs or subscriptions (e.g., PS1, PS2) and implementing a co-existence manager software 228 (e.g., CXM). By implementing modem software, subscription protocol stacks, and the co-existence manager software 228 on this integrated baseband modem processor 216, thread based instructions may be used on the integrated baseband modem processor 216 to communicate instructions between the software implementing the interference prediction, the mitigation techniques for co-existence issues, and the Rx and Tx operations.

The RF resources 218a, 218b may be communication circuits or transceivers that perform transmit/receive functions for the associated SIM of the wireless device. The RF resources 218a, 218b may be communication circuits that include separate transmit and receive circuitry, or may include a transceiver that combines transmitter and receiver functions. The RF resources 218a, 218b may be coupled to a wireless antenna (e.g., a first wireless antenna 220a and a second wireless antenna 220b). The RF resources 218a, 218b may also be coupled to the baseband modem processor 216.

In some embodiments, the general purpose processor 206, memory 214, baseband processor(s) 216, and RF resources 218a, 218b may be included in the multi-technology communication device 200 as a system-on-chip. In other embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the multi-technology communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in multi-technology communication device 200 to enable communication between them, as is known in the art.

In some embodiments, the multi-technology communication device 200 may instead be a single-technology or multiple-technology device having more or less than two RF chains. Further, various embodiments may implement, single RF chain or multiple RF chain wireless communication devices with fewer SIM cards than the number of RF chains, including without using any SIM card.

Figure 3:
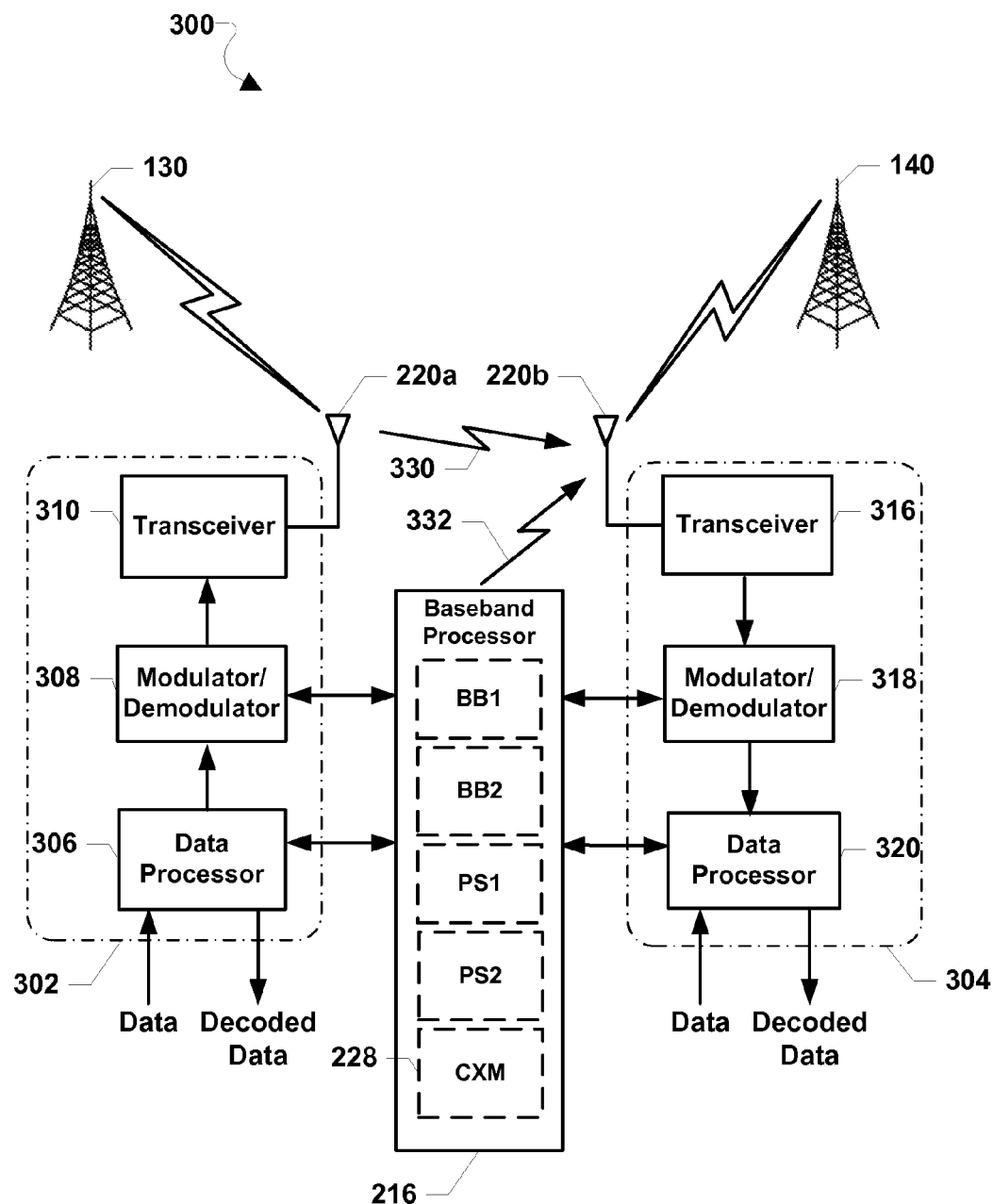
FIG. 3 is a component block diagram illustrating an interaction between components of different transmit/receive chains in various embodiments of a multi-technology wireless communications device.

FIG. 3 is a block diagram of a communication system 300 and illustrates embodiment interactions between components of different transmit/receive chains in a multi-technology wireless communications device. With reference to FIGS. 1-3, for example, a first radio technology RF chain 302 may be one RF resource 218a, and a second radio technology RF chain 304 may be part of another RF resource 218b. In some embodiments, the first and second radio technology RF chains 302, 304 may include components operable for transmitting data. When transmitting data, a data processor 306, 320 may format, encode, and interleave data in preparation for transmission. A modulator/demodulator 308, 318 may modulate a carrier signal with encoded data, for example, by performing Gaussian minimum shift keying (GMSK). One or more transceiver circuits 310, 316 may condition the modulated signal (e.g., by filtering, amplifying, and up-converting) to generate a RF modulated signal for transmission. The RF modulated signal may be transmitted, for example, to the base station 130, 140 via an antenna, such as the antenna 220a, 220b.

The components of the first and second radio technology RF chains 302, 304 may also be operable to receive data. When receiving data, the antenna 220a, 220b may receive RF modulated signals from the base station 130, 140 for example. The one or more transceiver circuits 310, 316 may condition (e.g., filter, amplify, and down-convert) the received RF modulated signal, digitize the conditioned signal, and provide samples to the modulator/demodulator 308, 318. The modulator/demodulator 308, 318 may extract the original information-bearing signal from the modulated carrier wave, and may provide the demodulated signal to the data processor 306, 320. The data processor 306, 320 may de-interleave and decode the signal to obtain the original, decoded data, and may provide decoded data to other components in the wireless device.

Operations of the first and second radio technology RF chains 302, 304 may be controlled by a processor, such as the baseband processor(s) 216. In the various embodiments, each of the first and second radio technology RF chains 302, 304 may be implemented as circuitry that may be separated into respective receive and transmit circuits (not shown).

Alternatively, the first and second radio technology RF chains 302, 304 may combine receive and transmit circuitry (e.g., as transceivers associated with SIM-1 and SIM-2 in FIG. 2).

As described, interference between the first and second radio technology RF chains 302, 304, such as de-sense and interpolation, may cause the desired signals to become corrupted and difficult or impossible to decode. For example, a transmission signal 330 sent by the first radio technology RF chain 302 may be errantly received by the second radio technology RF chain 304. In addition, electronic noise 332 from circuitry, such as the baseband processor 216, may also contribute to interference on the first and second radio technology RF chains 302, 304. To avoid such interference, the multi-technology communication device may implement various embodiment algorithms to estimate a nonlinear interference caused by the transmissions signal 330 and cancel the estimated nonlinear interference from victim signals received by the second radio technology RF chain 304.

For the purpose of providing a clear disclosure, signals received by a wireless communications device will be referred to as victim signals. However, victim signals may also be transmission signals experiencing desense caused by incoming received signals.

The various embodiments provide efficient algorithms that may be implemented in circuitry, in software, and in combinations of circuitry and software for estimating the nonlinear interference present in a victim signal without requiring a complete understanding or rigorous mathematical model of the aggressor signal or sources of the nonlinear interference. The embodiment algorithms are premised upon a general mathematical model of the nonlinear interferences, which for completeness is described below with reference to equations 1-3. These equations are not necessarily directly solvable, and provide a model for structuring that nonlinear interference cancellation system according to various embodiments described below beginning with FIG. 4A.

In this mathematical model, the actual nonlinear interference signal is modeled as the interference experienced by a victim signal as a result of one or more aggressor signal(s) z(i). In this model, the actual nonlinear interference signal L(i) caused by one or more hypothetical aggressor signal(s) z(i) on a hypothetical victim signal at a time "i" may be represented by the function:

$$L(i) = \sqrt{JNR} \cdot J(z(i)) \quad [\text{Eq. 1}]$$

where JNR is a jammer to noise ratio (a value that could be measured at time i) and $J(z(i))$ is a Jacobian matrix of all hypothetical aggressor signals z(i). JNR is a value that can be calculated based on measurements but is not required in the embodiment algorithms.

Similarly, the estimated nonlinear interference signal $\hat{L}(i)$ for a time "i" may be expressed as:

$$\hat{L}(i) = \sqrt{JNR} \cdot \hat{J}(z(i)) \quad [\text{Eq. 2}]$$

where JNR is again the jammer to noise ratio and $\hat{J}(z(i))$ is a Jacobian matrix of all aggressor signals z(i) (discussed in detail with reference to FIGS. 4B-6B below). The estimated function $\hat{L}(i)$ is an estimate of the actual nonlinear interference signal L(i) as discussed above. This estimated nonlinear interference signal $\hat{L}(i)$ may be the result of manipulation of the aggressor signal z(i) by the multilayer perceptron neural network with Hammerstein structure according to various embodiments as described below.

A victim signal y(i), may be the signal actually received by the multi-technology wireless communications device and may be degraded as a result of interference from the one or more aggressor signals z(i). The victim signal y(i) for the time "i" received by the multi-technology wireless communications device may be represented as the function:

$$y(i)=\sqrt{SNR}\cdot x(i)+\sqrt{JNR}\cdot J(z(i))+v(i) \quad [Eq. 3]$$

where elements of the victim signal y(i) may be expressed in terms of the signal-to-noise ratio (SNR), the intended receive signal represented as a function x(i), the jammer-to-noise ratio (JNR) of equation 2, the Jacobian matrix of all aggressor signals z(i), and a noise in the victim signal, such as thermal noise and inter-device interference, represented by the function v(i). As with equations 1 and 2 above, the victim signal in equation 3 is provided as a mathematical representation illustrating the relationship between the various signals.

Theoretically, the intended received signal x(i) may be obtained by rearranging the terms in Equation 3 to solve for x(i). A direct solution of these model equations may not be feasible in real time, particularly within mobile communication devices that have limited processing power. Therefore, the various embodiments employ a multilayer perceptron neural network with Hammerstein structure to generate an estimate of the nonlinear interference signal L(i) without directly solving equation 1-3.

Figure 4A:
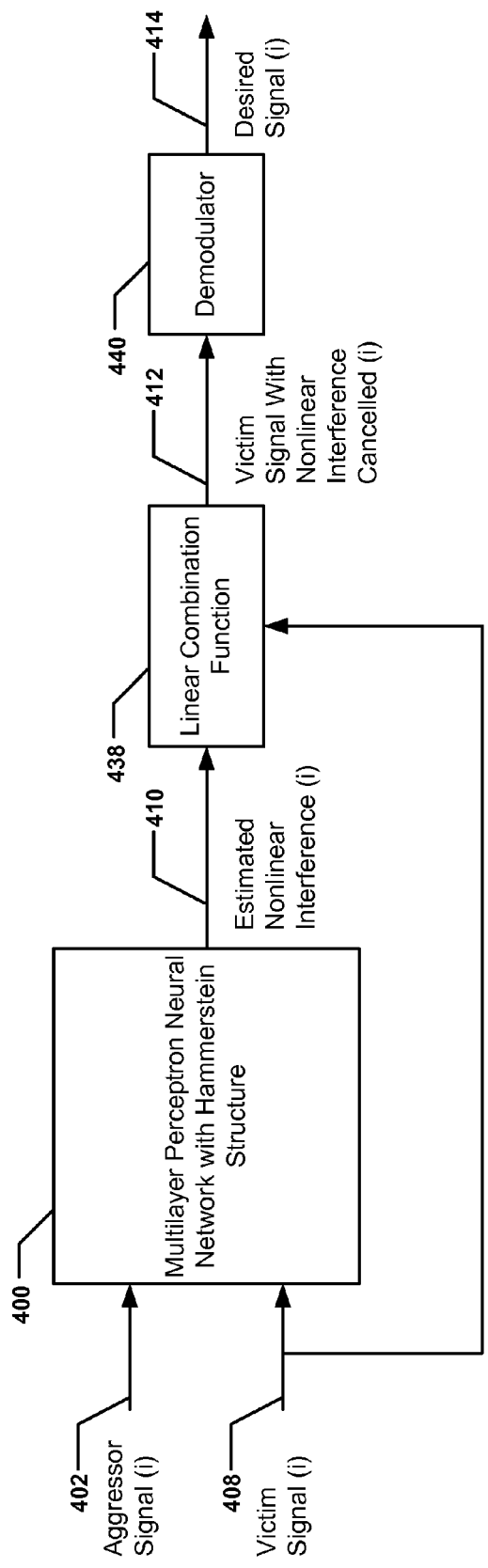
FIG. 4A is a component block diagram illustrating a nonlinear interference cancellation system in accordance with various embodiments.

FIG. 4A illustrates a nonlinear interference cancellation system including a multilayer perceptron neural network with Hammerstein structure 400 that may be used to remove an estimate of the nonlinear interference from a victim signal in accordance with various embodiments. With reference to FIGS. 1-4A, the multilayer perceptron neural network 400 may be implemented in a multi-technology wireless communications device (e.g., 110, 120, 200 in FIGS. 1 and 2) in software, general processing hardware, dedicated hardware, or a combination of any of the preceding. The multilayer perceptron neural network 400 may be configured to receive an aggressor signal 402 and a victim signal 408 at a time "i". The multilayer perceptron neural network 400 may be configured to produce an estimated nonlinear interference signal 410 for the time "i".

Figure 4B:
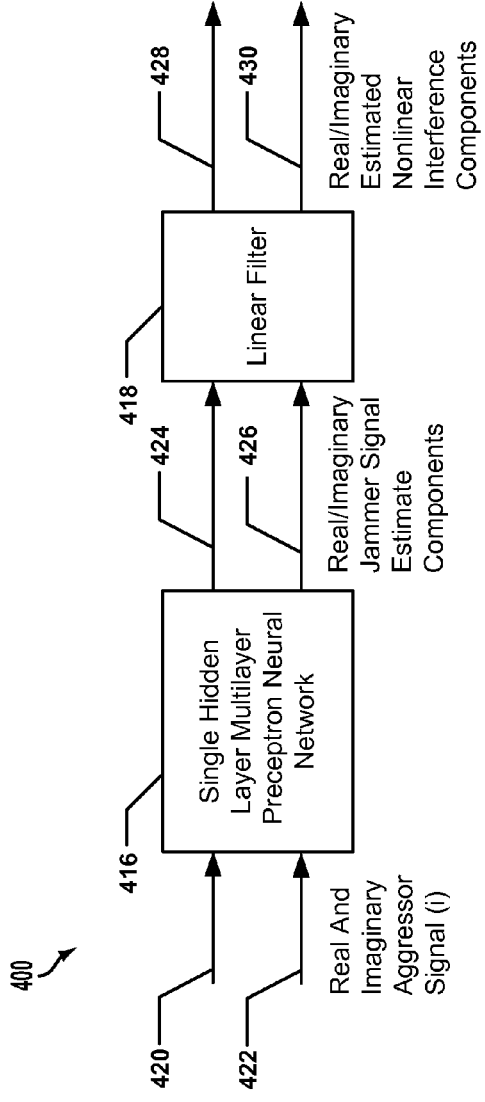
FIG. 4B is a component block diagram illustrating a multilayer perceptron neural network with Hammerstein structure with a linear input in accordance with various embodiments.
Figure 4C:
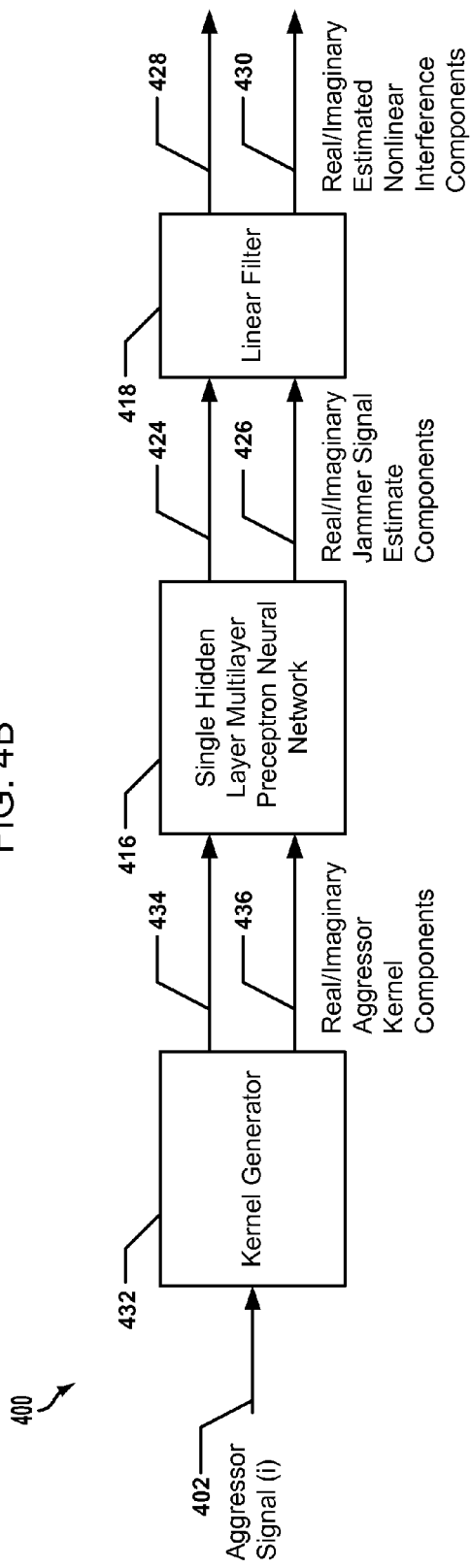
FIG. 4C is a component block diagram illustrating a multilayer perceptron neural network with Hammerstein structure with a kernel input in accordance with various embodiments.

In some embodiments, the multilayer perceptron neural network with Hammerstein structure 400 may be a neural network technique (e.g., multilayer perceptron) and linear filtering technique (e.g., Hammerstein structure) implemented in a multi-technology wireless communications device (shown in FIGS. 4B-4C). For any time "i", the multilayer perceptron neural network 400 may be implemented to help identify an intended receive signal x(i), the signal the communications device would have received but for the experienced interference, from among the elements of the actually received victim signal 408 y(i). Given an aggressor signal 402 z(i), the multilayer perceptron neural network 400 may implement perceptron machine learning algorithms combined with linear filtering to produce an estimated nonlinear interference signal 410 for time "i" that may be cancelled from the victim signal 408.

The estimated nonlinear interference signal 410 for the time "i" may be used by a linear combination function 438 to cancel the estimated nonlinear interference signal 410 from the victim signal 408. For example, the linear combination function 438 may subtract, add, or otherwise mathematically manipulate portions of the estimated nonlinear interference signal 410 affecting the victim signal 408. Thus, unnecessary elements of the victim signal 408 caused by aggressor signal 402 interference may be removed from the victim signal 402 and elements obscured by aggressor signal 402 interference may be recaptured. The result of the linear combination function 438 may be the victim signal with the nonlinear interference cancelled 412. A demodulator 440 may receive the victim signal with the nonlinear interference cancelled 412 and demodulate it to produce the desired signal 414.

In various embodiments, the multilayer perceptron neural network with Hammerstein structure 400 may include computer implementations of perceptron machine learning algorithms. One or more aggressor signals 402 z(i) may be provided as input to the multilayer perceptron neural network with Hammerstein Structure 400 as will be discussed in greater detail with reference to FIGS. 4B-6B below. The aggressor input(s) may be manipulated by the multilayer perceptron neural network with Hammerstein structure 400 in a series of mathematical operations and estimations to generate the estimated nonlinear interference signal 410. Because of the mathematical complexity associated with calculation of an actual nonlinear interference signal, perceptron machine learning algorithms and linear filter functions (e.g., Hammerstein structure) may be implemented to produce an estimate of an experienced nonlinear interference signal such as the estimated nonlinear interference signal 410. As such, the various formulas described herein are mathematical representations of actual and estimated signals that are utilized or produced by the multilayer perceptron neural network with Hammerstein structure 400. These mathematical representations may not be actively calculated by the multilayer perceptron neural network 400, but are provided to enable one of ordinary skill in the art to realize the relationships between elements of the various signals as they are manipulated by the operations described herein.

As discussed with reference to equations 1 and 2 above, the estimated nonlinear interference signal 410 may be described in terms of one or more aggressor signals 402 z(i). Thus, the production of the estimated nonlinear interference signal 410 may depend on the manipulation of the aggressor signals 402 by the multilayer perceptron neural network with Hammerstein structure 400. In some embodiments, the multilayer perceptron neural network with Hammerstein structure 400 may accept a linearized aggressor signal (i.e., linear input). In some embodiments, the multilayer perceptron neural network may accept the result of a kernel function executed on the aggressor signal 402 (i.e., aggressor kernel(s)). These embodiments will be discussed in greater detail with reference to FIGS. 4B and 4C below.

Generating the estimated nonlinear interference signal 410 for the time "i" may be accomplished by the multilayer perceptron neural network 400 in a semi-blind and universal manner. In other words, the multilayer perceptron neural network 400 may calculate the estimated nonlinear interference signal 410 knowing some information about the radio access technology used by the multi-technology wireless communications device and/or the kind of interference occurring on the victim signal 408. This information may include the radio band of the aggressor and/or victim signal and other transmission information. In embodiments in which the aggressor signal 402 is converted into an aggressor kernel, the order of the kernel function may be dictated by the transmission information. For example, in various embodiments, aggressor signals transmitted on a particular radio band may require manipulation using a kernel function of order "b" to produce an aggressor kernel.

FIG. 4B illustrates the multilayer perceptron neural network with Hammerstein structure 400 receiving a linear input. With reference to FIGS. 1-4B, the linear input may include the aggressor signal 402. The aggressor signal 402 may have a mathematical representation that is a complex structure with imaginary and real elements. Thus, the aggressor signal may include a real aggressor signal component 420 and an imaginary aggressor signal component 422. The real aggressor signal component 420 may be represented by $z_{Real}(i)$, and the imaginary aggressor signal component 422 may be represented by $z_{Imaginary}(i)$. The linear input may be received at a single hidden layer multilayer perceptron neural network 416. As discussed further with reference to FIG. 6A, the single hidden layer multilayer perceptron neural network 416 may produce a jammer signal estimate having a complex structure. Like the aggressor signal components 420, 422, the complex jammer signal estimate may include a real jammer signal estimate component 424 and an imaginary jammer signal estimate component 426. A linear filter 418, such as a finite impulse response filter, may receive a real jammer signal estimate component 424 and an imaginary jammer signal estimate component 426. The linear filter 418 may use the real and imaginary jammer signal estimate components 424, 426 to produce a complex estimated nonlinear interference (i.e., an estimated nonlinear interference signal having a complex structure), as discussed further with reference to FIG. 6C. The complex estimated nonlinear interference may include an estimated real nonlinear interference component 428 and an estimated imaginary nonlinear interference component 430.

FIG. 4C illustrates the multilayer perceptron neural network with Hammerstein structure 400 receiving a kernel input. With reference to FIGS. 1-4C, the single hidden layer multilayer perceptron neural network 416 may be configured to receive an aggressor kernel generated by a kernel generator 432. The aggressor kernel may have a complex structure including a real aggressor kernel component 434 and an imaginary aggressor kernel component 436. The aggressor kernel may be the result of a kernel function applied to all or a portion of the aggressor signal 402. The multilayer perceptron neural network with Hammerstein structure 400 may be configured to utilize the complex aggressor kernel to calculate the estimated nonlinear interference signal 410 for the time "i".

As described, the aggressor signal 402 may be represented as a function z(i) for the time "i". The kernel generator function employed by the kernel generator 432 may be one of various kernel functions such an harmonic or exponential expansion of order "r", for example z(i). The resulting aggressor kernel may have a complex structure with both real and imaginary components. Thus, the aggressor kernel $\hat{z}(i)$ may be represented as:

$$\hat{z}_{Real}(i) = \text{Real part of } \ker(z(i)) \quad [\text{Eq. 4a}]$$

$$\hat{z}_{Imaginary}(i) = \text{Imaginary part of } \ker(z(i)) \quad [\text{Eq. 4b}]$$

where ker(z(i)) is the application of a selected kernel function on the aggressor signal 402 z(i) by the kernel generator 432.

As discussed with reference to FIG. 4B and with further reference to FIG. 6B, the aggressor signal 402, the real aggressor kernel component 434 and the imaginary aggressor kernel component 436 may be received at the single hidden layer multilayer perceptron neural network 416, and used to produce the real jammer signal estimate component 424 and an imaginary jammer signal estimate component 426. The linear filter 418 may receive the real jammer signal estimate component 424 and an imaginary jammer signal estimate component 426 and produce the estimated real nonlinear interference component 428 and the estimated imaginary nonlinear interference component 430.

Figure 5:
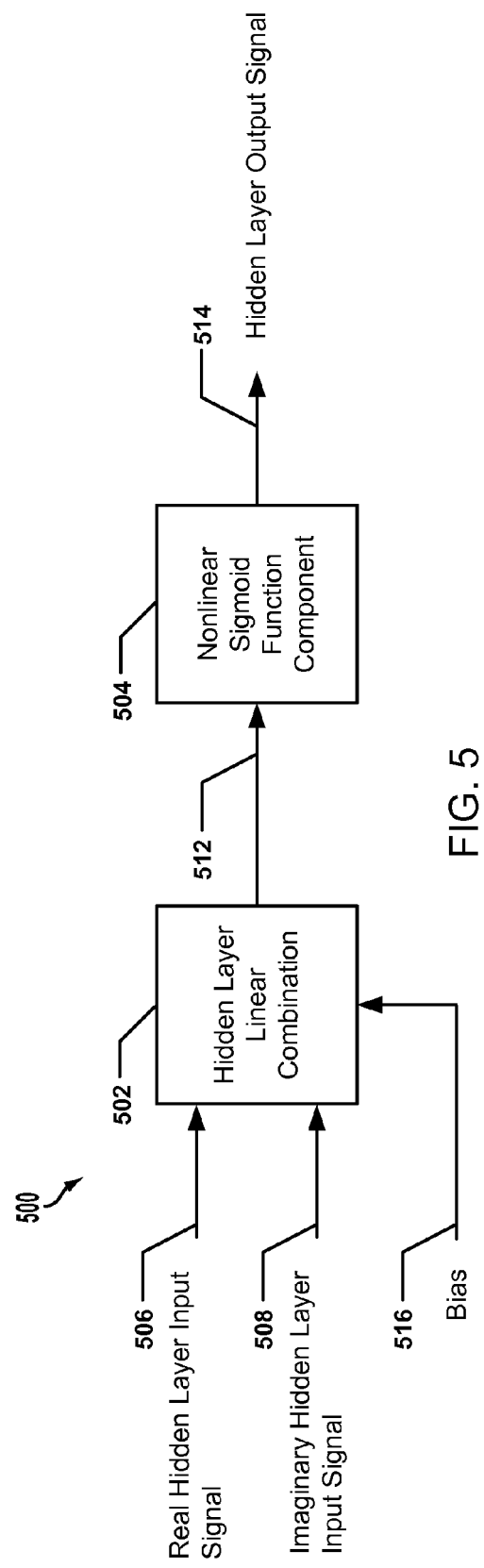
FIG. 5 is a component block diagram illustrating a node of a hidden layer of a multilayer perceptron neural network in accordance with various embodiments.

FIG. 5 illustrates a node 500 of a hidden layer of the multilayer perceptron neural network (e.g., 400 in FIG. 4) in accordance with various embodiments. With reference to FIGS. 1-5, the multilayer perceptron neural network with Hammerstein structure 400 may include a hidden layer, which may further the calculation of the estimated nonlinear interference signal for time "i". The hidden layer may include one or more nodes 500. The number of nodes may be dictated by the level of accuracy desired for the estimated nonlinear interference. Larger quantities of nodes may provide more accurate estimates of nonlinear interference signals, but may require greater computational resources. Each node 500 may produce a hidden layer output signal 514, which may be passed as an input to the output layer, which will be described with reference to FIGS. 6A-6C below.

Each node 500 may receive a real hidden layer input signal 506 and an imaginary hidden layer input signal 508. As discussed further with reference to FIGS. 6A and 6B, the real and imaginary hidden layer input signals 506, 508 may be the real and imaginary aggressor signal components 420, 422, or the real and imaginary aggressor kernel components 434, 436. The real and imaginary hidden layer input signals 506, 508 may be augmented by one or more weight factors. The node 500 may include a hidden layer linear combination 502 that may be implemented with general processing hardware, dedicated processing hardware, and/or software. In various embodiments, the hidden layer linear combination 502 may not be the same as the linear combination function 438 used to cancel an estimated nonlinear interference signal 410 from the victim signal 408. The hidden layer linear combination 502 may be implemented within each node structure of the multilayer perceptron neural network with Hammerstein structure 400. The hidden layer linear combination 502 may receive the hidden layer input signals 506, 508 and a bias 516, as described with reference to FIGS. 6A and 6B, and combine them into a hidden layer intermediate signal 512. The resulting hidden layer intermediate signal 512 may be represented as a function $\theta_n(i)$ at the hidden layer linear combination 502 "n" for the time "i". The hidden layer may have "K" nodes, each having a hidden layer linear combination 502; therefore, the specific number "n" of a hidden layer linear combination may range from 1 to "K". The hidden layer intermediate signal $\theta_n(i)$ may be expressed in terms of the linear combination of the hidden layer input signals 506, 508 and the bias 516. The bias 516 may be represented by a constant "b".

The one or more weight factors that may augment the hidden layer input signals 506, 508 may be represented as a weight factor "$V_{n,e}$" for hidden layer linear combination "n" and hidden layer input signal/bias "e" (e.g., e=0 for a bias term, e=1 for a real hidden layer input signal, and e=2 for an imaginary hidden layer input signal). The number of weights used to augment the hidden layer input signals 506, 508 and the bias 516 may be dictated by (2+1)*K, i.e., the number of hidden layer inputs combined with the number of biases multiplied by the number of nodes.

The linear combination of the elements of the hidden layer intermediate signal 512 may include a summation of the hidden layer input signals 506, 508 and bias 516 augmented by the one or more weight factors. In embodiments in which the hidden layer input signals 506, 508 represent the real aggressor signal component 420 and the imaginary aggressor signal component 422 (in FIG. 4B), respectively, the hidden layer intermediate signal $\theta_n(i)$ 512 for the hidden layer linear combination "n" and the time "i" may be represented by the following function:

$$\theta_n(i)=V_{n,0}b+V_{n,1}z_{Real}(i)+V_{n,2}z_{Imaginary}(i) \quad [\text{Eq. 5}]$$

where "$V_{n,e}$" is the weight factor at hidden layer linear combination 502 "n" for bias "b", real aggressor signal component 420 "$z_{Real}(i)$", and imaginary aggressor signal component 422 "$z_{Imaginary}(i)$".

In embodiments in which the hidden layer input signals 506, 508 represent the real aggressor kernel component 434 and the imaginary aggressor kernel component 436 (in FIG. 4C), respectively, the hidden layer intermediate signal 512 for the hidden layer linear combination "n" and the time "i" may be represented by the following function:

$$\theta_n(i)=V_{n,0}b+V_{n,1}\hat{z}_{Real}(i)+V_{n,2}\hat{z}_{Imaginary}(i) \quad [\text{Eq. 6}]$$

where "$V_{n,e}$" is the weight factor at hidden layer linear combination 502 "n" for bias "b", real aggressor signal component 420 "$\hat{z}_{Real}(i)$", and imaginary aggressor signal component 422 "$\hat{z}_{Imaginary}(i)$".

A node 500 may further include a nonlinear sigmoid function component 504, which may be implemented with general processing hardware, dedicated processing hardware, and/or software. The nonlinear sigmoid function component 504 may receive the hidden layer intermediate signal 512 from the hidden layer linear combination 502 and execute a nonlinear sigmoid function, for example a hyperbolic tangent function, on the hidden layer intermediate signal 512. The sigmoid function may be represented as a function $\sigma(\theta_n(i))$, where "$\theta_n(i)$" is the hidden layer intermediate signal 512 on which the nonlinear sigmoid function is executed.

A result of the execution of the nonlinear sigmoid function may be a hidden layer output signal 514. As discussed, the hidden layer output signal 514 may be used as an output layer input signal. The hidden layer output signal 514 may be represented as $\phi_g(i)$ for a nonlinear sigmoid function component "g", where sigmoid function "g" may equal the hidden layer linear combination "n", for the time "i". Thus, the hidden layer output signal $\phi_g(i)$ 514 may be represented using the following function:

$$\phi_g(i)=\sigma(\theta_n(i)) \quad [\text{Eq. 7}]$$

where the nonlinear sigmoid function "$\sigma(\theta_n(i))$" is executed on the hidden layer intermediate signal 512 "$\theta_n(i)$" for a hidden layer linear combination 502 "n".

In some embodiments, the nonlinear sigmoid function component 504 may be implemented using a table of precalculated results. The table contents may be calculated by applying the nonlinear sigmoid function to various potential values of the hidden layer intermediate signal 512 to generate a number of sample results. In such embodiments, the nonlinear sigmoid function component 504 may retrieve the nonlinear sigmoid function value associated with a hidden layer intermediate signal value in the table and produce the nonlinear sigmoid function value as the hidden layer output signal 514.

Figure 6A:
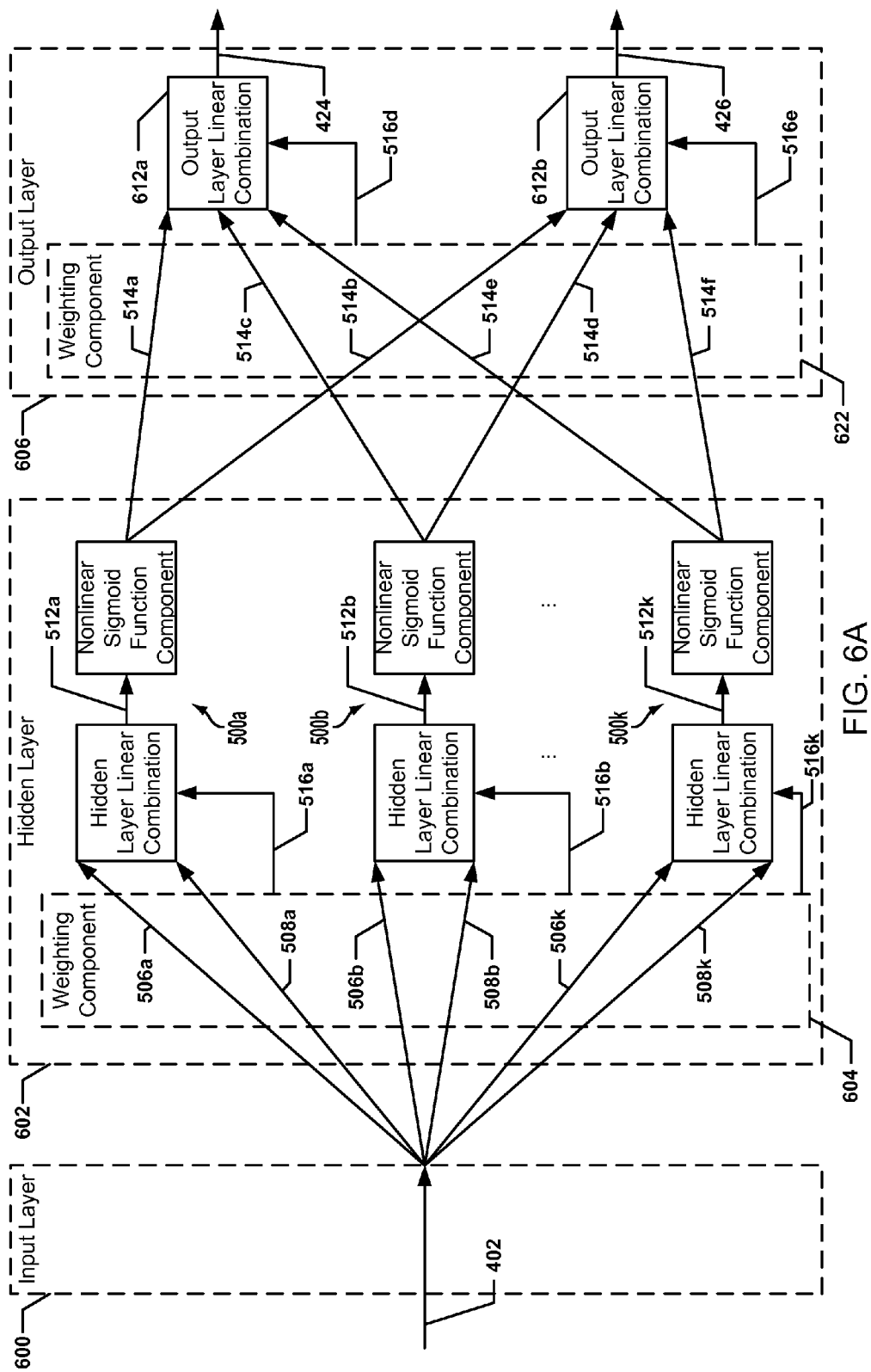
FIG. 6A is a functional block diagram illustrating an interaction between components of a multilayer perceptron neural network with a linear input in accordance with various embodiments.

FIG. 6A illustrates interactions between components of the perceptron neural network portion of a multilayer perceptron neural network with Hammerstein structure (e.g., 400 in FIG. 4A) with a linear input (e.g., 402 in FIG. 4A, or 420 and 422 in FIG. 4B) in accordance with various embodiments. With reference to FIGS. 1-6A, the multilayer perceptron neural network may include an input layer 600, a hidden layer 602, and an output layer 606. For purposes of clarity, the multilayer perceptron neural network is described with reference to a single aggressor signal; however, multiple aggressor signals may interfere with the victim signal and consequently multiple aggressor signals may be used to produce the estimated nonlinear interference signal.

The input layer 600 may receive the aggressor signal 402 and pass it to the hidden layer 602. The aggressor signal 402 may be passed to and received by each node 500a, 500b, 500k of the hidden layer 602. The aggressor signal 402 may be presented to each node 500a, 500b, 500k by respective real hidden layer inputs 506a, 506b, 506k and respective imaginary hidden layer inputs 508a, 508b, 508k. The real hidden layer inputs 506a, 506b, 506k may represent the real aggressor signal component 420 (in FIG. 4B), and the imaginary hidden layer inputs 508a, 508b, 508k may represent the imaginary aggressor signal component 422 (in FIG. 4B).

The real hidden layer inputs 506a, 506b, 506k and the imaginary hidden layer inputs 508a, 508b, 508k may be augmented by a weighting component 604, which may apply one or more weight factors to each of the real hidden layer inputs 506a, 506b, 506k and the imaginary hidden layer inputs 508a, 508b, 508k. The weighting component 604 may also provide a bias 516a, 516b, 516k to each hidden layer linear combination 502 of each node 500a, 500b, 500k. The weighting component 604 may be an individual component of the multilayer perceptron neural network implemented with general purpose hardware, dedicated hardware, and/software, or the weighting component 604 may be incorporated into the linear combination component. The weighting component 604 may apply one or more initial weight factors to the real hidden layer inputs 506a, 506b, 506k and the imaginary hidden layer inputs 508a, 508b, 508k. The one or more weight factors may be preprogrammed and configured to reduce the error in the nonlinear interference function estimation.

The initial weight factors may be selected at random from within a range of values, such as a range of about −0.5 to about 0.5 (or other suitable range). In some embodiments, the initial weight factors may be selected based on historical performance of previous weight factors to reduce the error in the estimation of the nonlinear interference signal. As will be discussed in further detail, the weighting component 604 may train the weight factors at different times to improve the accuracy of the estimated nonlinear interference signal.

Each of the nodes 500a, 500b, 500k may individually execute a linear combination of the respective real hidden layer inputs 506a, 506b, 506k and the respective imaginary hidden layer inputs 508a, 508b, 508k augmented with the weight factors and the respective bias 516a, 516b, 516k. A result of the linear combination may be the hidden layer intermediate signals 512a, 512b, 512k. The nodes 500a, 500b, 500k may execute the nonlinear sigmoid function for the hidden layer intermediate signals 512a, 512b, 512k to produce the hidden layer output signals 514a, 514b, 514c, 514d, 514e, 514f. Like the hidden layer input signals 506a, 508a, 506b, 508b, 506k, 508k the hidden layer output signals may be separated into real portions (e.g., Hidden layer output signals 514a, 514c, 514e) and imaginary portions (e.g., 514b, 514d, 514f). Hidden layer output signals 514a, 514b, 514c, 514d, 514e, 514f of the hidden layer 602 of the multilayer perceptron neural network may be passed to an output layer 606. The hidden layer output signals 514a, 514c, 514e may be received by a first node of the output layer 606, and the hidden layer output signals 514b, 514d, 514f may be received by a second node of the output layer 606. The output layer 606 or nodes of the output layer may include a similar weighting component 622 and an output layer linear combination components 612a, 612b, as in the hidden layer 602. The weighting component 622 of the output layer 606 may augment each of the received hidden layer output signals 514a, 514b, 514c, 514d, 514e, 514f with one or more weight factors and provide the output layer linear combination 612a, 612b with a bias 516d, 516e.

The one or more weight factors that may augment the hidden layer output signals 514a, 514b, 514c, 514d, 514e, 514f may be represented as a weight factor "$W_{q,t}$" for output layer linear combination "q" and each set of output layer input signal/bias "t". The number of weight factors used to augment the hidden layer input signals 506, 508 and the bias 516 may be dictated by 2*(K+1), i.e. the number of hidden layer nodes from which output signals are received combined the number of biases multiplied by the number of output layer linear combinations 612a, 612b.

The linear combination component 612a may execute a linear combination of the augmented hidden layer output signals 514a, 514c, 514e and the bias 516d. The linear combination component 612b may execute a linear combination of the augmented hidden layer output signals 514b, 514d, 514f and the bias 516e. The hidden layer output signals 514a, 514b, 514c, 514d, 514e, 514f produced by the same hidden layer node 500a, 500b, 500k may represent the same value, but may be augmented by the same or a different weight factor. The linear combination of the augmented hidden layer output signals 514a, 514c, 514e and the bias 516d executed by the output layer linear combination 612a may produce the real jammer signal estimate component 424 as an output layer output signal. The linear combination of the augmented hidden layer output signals 514b, 514d, 514f and the bias 516e executed by output layer linear combination component 612b may produce the imaginary jammer signal estimate component 426 as an another output layer output signal. In other words, the real jammer signal estimate component $\hat{s}_{Real}(i)$ 424 and the imaginary jammer signal estimate component $\hat{s}_{Imaginary}(i)$ 426 for time "i" with bias "b" may be represented by the following functions:

$$\hat{s}_{Real}(i) = W_{1,0}b + W_{1,1}\phi_1(i) + \ldots + W_{1,t-1}\phi_g(i) \quad [\text{Eq. 8a}]$$

$$\hat{s}_{Imaginary}(i) = W_{2,0}b + W_{2,1}\phi_1(i) + \ldots + W_{2,t-1}\phi_g(i) \quad [\text{Eq. 8b}]$$

where "$W_{p,q}$" represents a weight factor for output layer node "p" and hidden layer output signal/bias "t", "b" is the bias term, and "$\phi_g(i)$" is the hidden layer output signal for a nonlinear sigmoid function "g" at the itme "i".

Figure 6B:
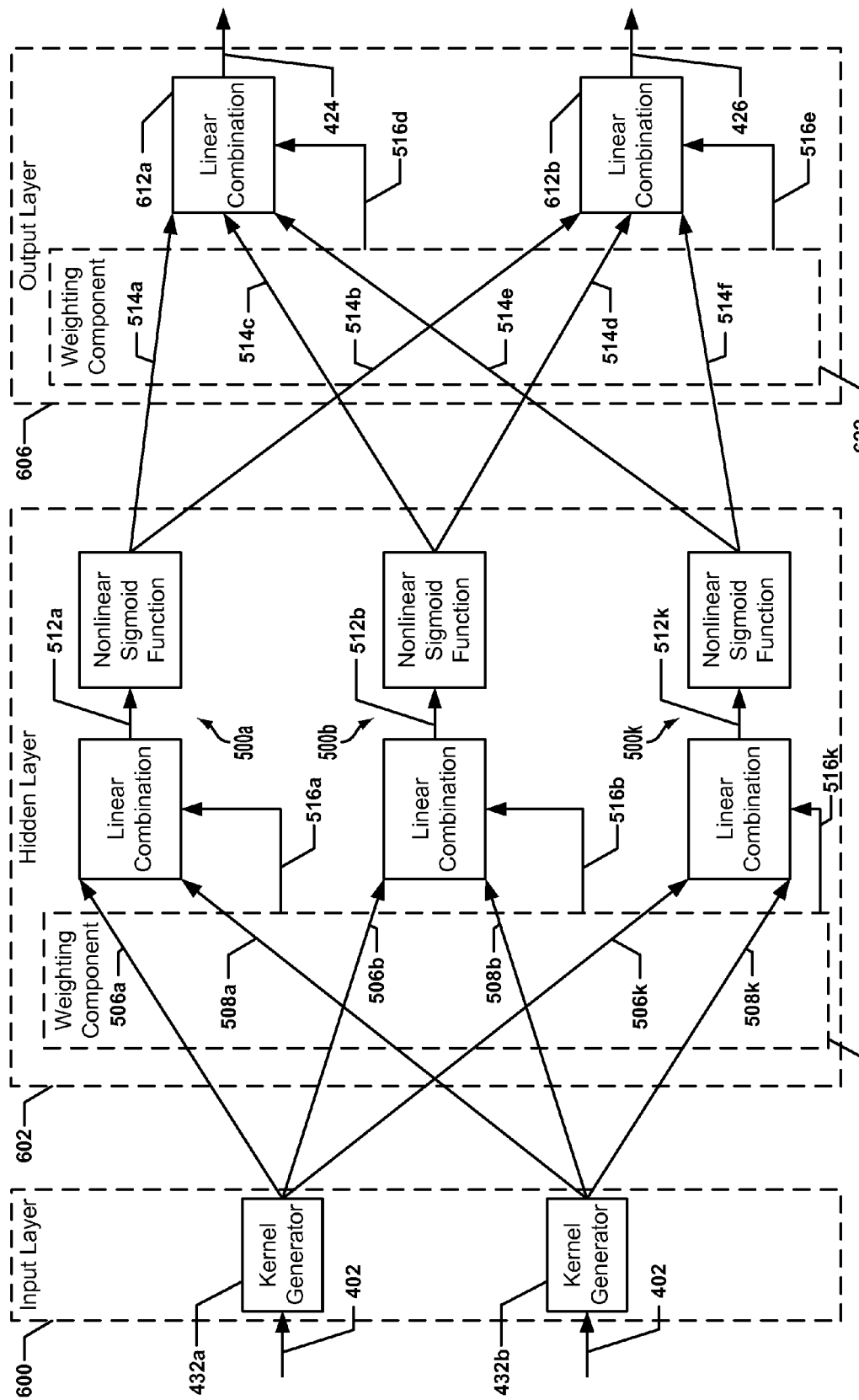
FIG. 6B is a functional block diagram illustrating an interaction between components of a multilayer perceptron neural network with a kernel input in accordance with various embodiments.

FIG. 6B illustrates interactions between components of a multilayer perceptron neural network of a multilayer perceptron neural network with Hammerstein structure(e.g., 400 in FIG. 4A) with a kernel input (e.g., 434 and 436 in FIG. 4C) in accordance with various embodiments. With reference to FIGS. 1-6B, the multilayer perceptron neural network may include similar components and functions as the multilayer perceptron neural network described with reference to FIG. 6A. However, in FIG. 6B, the real hidden layer inputs 506a, 506b, 506k may represent the real aggressor kernel component 434 (in FIG. 4C), generated by a real kernel generator 432a operating on the aggressor signal 402, and the imaginary hidden layer inputs 508a, 508b, 508k may represent the imaginary aggressor kernel component 436 (in FIG. 4C), generated by an imaginary kernel generator 432b also operating on the aggressor signal 402. Therefore, the remaining functions of the multilayer perceptron neural network may be executed using the real aggressor kernel component and the imaginary aggressor kernel component in place of the real aggressor signal component 420 and the imaginary aggressor signal component 422 (in FIG. 4B).

As discussed above with reference to FIG. 4C, aggressor kernels 434 and 436 may be generated by executing a kernel function on the aggressor signal 402 then dividing the result into a mathematically real portion (i.e., the real aggressor kernel component 434) and a mathematically imaginary component (i.e., imaginary aggressor kernel component 436) to reduce the complexity of producing the estimated nonlinear interference signal 410.

Figure 6C:
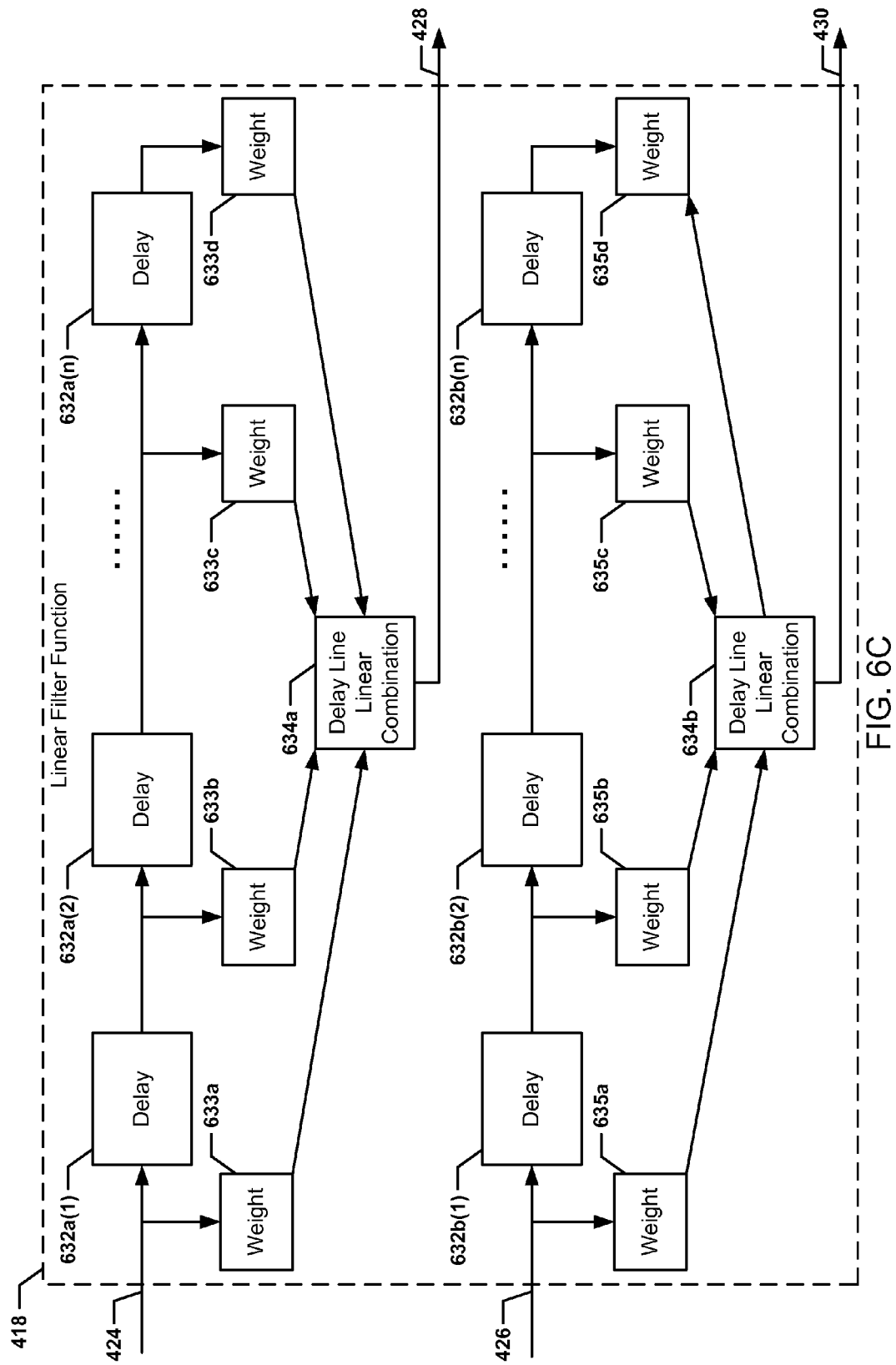
FIG. 6C is a functional block diagram illustrating an interaction between components of a linear filter function in accordance with various embodiments.

FIG. 6C illustrates interactions between components of a linear filter 418, such as a finite impulse response filter, in accordance with various embodiments. The linear filter 418 may represent the Hammerstein structure of a multilayer perceptron neural network with Hammerstein structure (e.g., 400 in FIG. 4A). With reference to FIGS. 1-6C, the linear filter 418 that may be executed to filter the real and imaginary jammer signal estimate components 424, 426. A result of the jammer signal estimate component filtering may be the production of a real estimated nonlinear interference component 428 and an imaginary estimated nonlinear interference component 430. In some embodiments the linear filter 418 may be a finite impulse response filter having multiple delay lines and associated delay line linear combinations. In some embodiments, the linear filter may include a delay line 632a(1)-(n) for the real jammer signal estimate component 424, and a delay line 632b(1)-(n) for the imaginary jammer signal estimate component 426. Sets of weighting components 633a-d, 635a-d may augment the real and imaginary jammer signal estimate components 424, 426 respectively at each operation of the delay lines 632a(1)-(n), 632b(1)-(n). The linear filter 418 may further include delay line linear combinations 634a, 634b that sum the real and imaginary jammer signal estimate components 424, 426 as they are sampled by the delay lines 632a(1)-(n), 632b(1)-(n) and augmented with the weighting components 633a-d, 635a-d. The results of linearly combinations by the delay line linear combinations 634a, 634b may be the real estimated nonlinear interference component 428 and the imaginary estimated nonlinear interference component 430. Each operation of the delay lines 632a(1)-(n), 632b(1)-(n) and their associated weighting component 633a-d, 635a-d are referred to as a "tap" of the linear filter function.

In various embodiments, the linear filter 418 may have a Hammerstein structure. In some embodiments, the linear filter 418 may have another impulse response filter structure. The number of delays in the delay lines 632a(1)-(n), 632b(1)-(n) and associated weighting components 633a-d, 635a-d applied to the real and imaginary jammer signal estimate components 424, 426 may correspond to the number of taps "M", in the linear filter function. The mathematical operations associated with and the configuring of a linear filter function, such as a finite impulse response filter, will be known to one of ordinary skill in the art, therefore the mathematical theory underlying such configurations will not be discussed herein.

In an embodiment, the weighting components 633a-d, 635a-d may augment each of the received real and imaginary jammer signal estimate components 424, 426 with a weight factor during each iteration of the delay line 632a(1)-(n), 632b(1)-(n) of a linear filter function. After each augmentation the result is passed to and received by a respective delay line linear combination 634a, 634b. Culmination of the augmentation and linear combination (e.g., execution of the linear filter function) may produce the real estimated nonlinear interference component 428 and the imaginary estimated nonlinear interference component 430.

The linear filter 418 may have "M" taps. The sets of weighting components 633a-d, 635a-d may be represented by "$a_{pm}$," where "p" is the aggressor kernel vector row (e.g., p=1 for real input or p=2 for imaginary input) and "m" is the current tap of the linear filter function. Results of the linear filter 418 may be expressed in terms of the real and imaginary jammer signal estimate components 424 $\hat{s}_{Real}$, 426 $\hat{s}_{Imaginary}$ and the sets of weights 633*a-d*, 635*a-d*. Thus, the real estimated nonlinear interference component 428 $\hat{L}_{Real}(i)$ and the imaginary estimated nonlinear interference component 430 $\hat{L}_{Imaginary}(i)$ for the time "i" may be represented by the following functions:

$$\hat{L}_{Real}(i) = \Sigma_{m=0}^{M-1} a_{1,m} \hat{s}_{Real}(i-m) \quad [\text{Eq. 9a}]$$

$$\hat{L}_{Imaginary}(i) = _{m=0}^{M-1} a_{2,m} \hat{s}_{Imaginary}(i-m) \quad [\text{Eq. 9b}]$$

The real estimated nonlinear interference component 428 and the imaginary estimated nonlinear interference component 430 may be combined to obtain the estimated nonlinear interference signal 410 (in FIG. 4A). The resulting nonlinear interference signal 410 may be cancelled from the received victim signal 408 y(i) to obtain an intended receive signal "x(i)". In various embodiments, the imaginary estimated \nonlinear interference component 430 may be augmented by a Jacobian matrix prior to combination with the real estimated nonlinear interference component 428 to obtain the estimated nonlinear interference signal 410. Thus, the estimated nonlinear interference signal 410 $\hat{L}(i)$ may be represented by the function:

$$\hat{L}(i) = \hat{L}_{Real}(i) + j\hat{L}_{Imaginary}(i) \quad [\text{Eq. 10}]$$

where $\hat{L}_{Real}(i)$ represents the real estimated nonlinear interference component 428, $\hat{L}_{Imaginary}(i)$ represents the imaginary estimated nonlinear interference 420, and "j" is a matrix multiplied by the imaginary estimated nonlinear interference. This model is for representative purposes and is provided to inform one of ordinary skill in the art about the relationship between elements of the estimated nonlinear interference signal 410.

The estimated nonlinear interference signal 410 may be used for multiple purposes by a multi-technology communications device. In some embodiments, the estimated nonlinear interference signal 410 may be cancelled or subtracted from the victim signal 408 so that the victim signal 408 may be decoded and understood by the multi-technology communications device. In some embodiments, the estimated nonlinear interference signal 410 may be used to train the weight factors of the multilayer perceptron neural network with Hammerstein structure, including the linear filter 418. Training the weight factors may improve the accuracy of the produced estimated nonlinear interference signal 410. An error level present in the estimation of the nonlinear interference may be determined by a function that compares the estimated nonlinear interference signal 410 to a measured interference of the victim signal 408. The error "E" may be calculated for any of the weight factors and "N" pairs of reference signals (where "N" also corresponds to the number of nodes in the hidden layer), and may be represented as the following function:

$$E = \frac{1}{2N} \sum_{i=1}^{N} \left\| y(i) - \hat{L}(i, V, W, a_1, a_2) \right\|^2 \quad [\text{Eq. 11}]$$

where y(i) is the victim signal 408, and $\hat{L}(i, V, W, a_1, a_2)$ is the estimated nonlinear interference signal 410 for a time "I" with hidden layer weight factors "V", output layer weight factors "W", and linear filter function weight factors "$a_1$, $a_2$."

In some embodiments, the error of the estimated nonlinear interference 410 may be compared to an error threshold to determine whether the error is acceptable. Determining that the error present in an estimation of the nonlinear interference signal is unacceptable may prompt the multilayer perceptron neural network with Hammerstein structure 400 to train or retrain the weight factors to reduce the error in the estimated nonlinear interference signal 410. The weight factors may be trained using a variety of optimization algorithms, for example gradient descent, the Gauss-Newton algorithm, and the Levenberg-Marquardt algorithm. Training of the weight factors may be regressively executed to further reduce the error of the estimated nonlinear interference signal 410. In some embodiments, satisfactory weight factors may be reused for subsequent nonlinear interference estimations. The reuse of previously determined weight factors may be based on one or more parameters, such as the time since the last adjustment of the weight factors and how the error in the estimated nonlinear interference 410 compares to the error threshold, and the like.

In the various examples, components of the multilayer perceptron neural network are shown individually or in combination. It should be understood that these examples are not limiting and the various other configurations of the components are considered. For example, the nodes 500*a*, 500*b*, 500*k* and their components are illustrated as separate components. However, any of the nodes 500*a*, 500*b*, 500*k* and/or components may be embodied in combination with other components, and multiples of the same component may be embodied in a single component.

Figure 7:
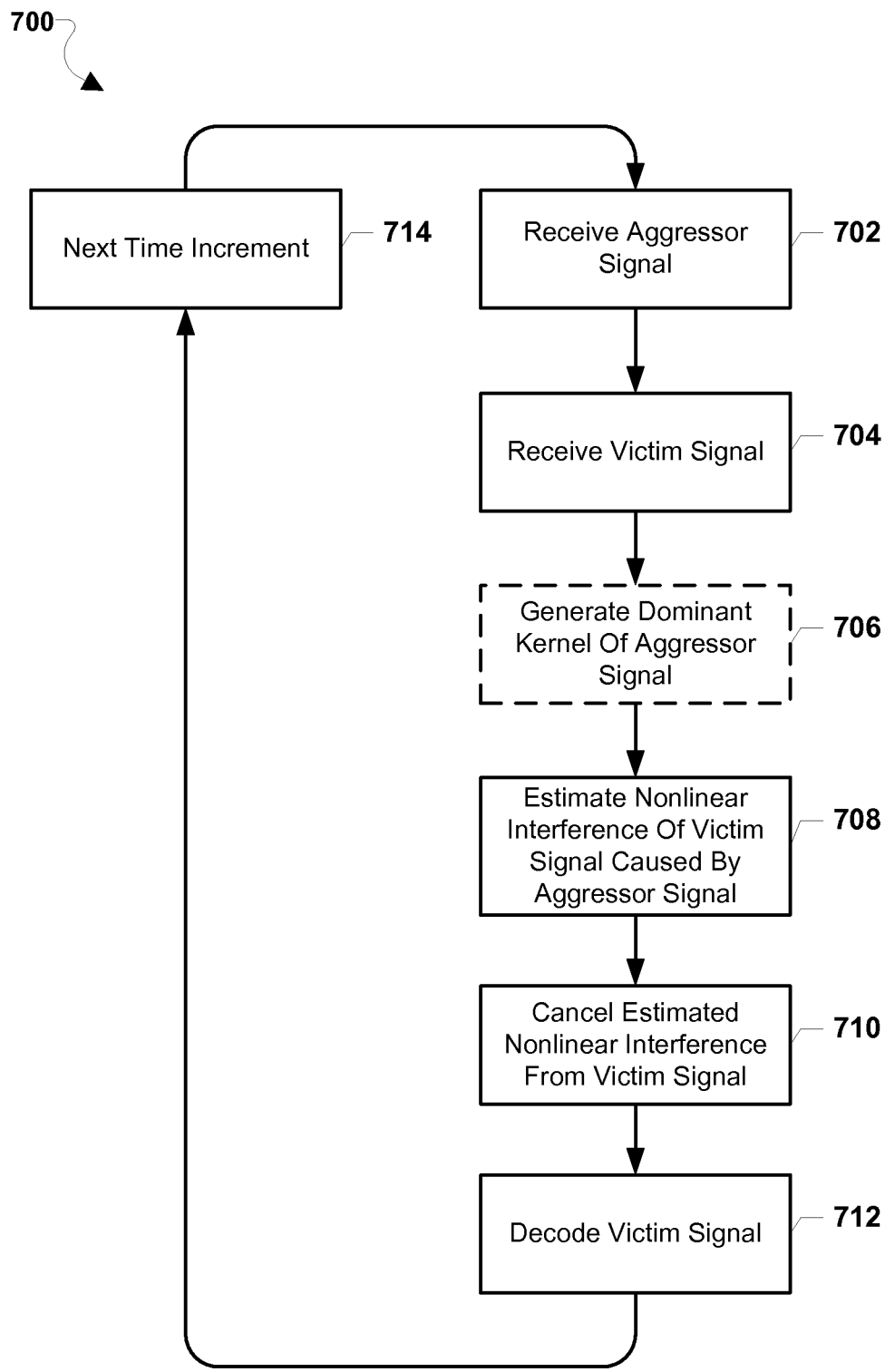
FIG. 7 is a process flow diagram illustrating a method for canceling nonlinear interference using a multilayer perceptron neural network with Hammerstein structure in various embodiments of a multi-technology wireless communications device in accordance with various embodiments.

FIG. 7 illustrates a method 700 for canceling nonlinear interference from a received signal using a multilayer perceptron neural network with Hammerstein structure (e.g., 400 in FIG. 4A) in a multi-technology wireless communications device in accordance with various embodiments. With reference to FIGS. 1-7, the method 700 may be executed in a computing device (e.g., 110, 120, 200) using software, general purpose or dedicated hardware, or a combination of software and hardware, such as the general purpose processor 206, baseband processor 216, or the like. In one example, the method may be performed by a processor of the multi-technology communication device. In block 702, the multi-technology communication device may receive an aggressor signal. The aggressor signal may be received by a first radio access technology of the multi-technology communication device from a transmission of a second radio access technology of the same multi-technology communication device.

In block 704, the multi-technology communication device may receive a victim signal. The victim signal may be received by the first radio access technology of the multi-technology communication device from a transmitting source device separate from the multi-technology communication device. The victim signal may initially be unaffected by interference when transmitted from the transmitting source device. However, the victim signal may experience interference caused by the aggressor signal during transmission to the multi-technology communication device.

In optional block 706, the multi-technology communication device may generate a dominant aggressor kernel from the aggressor signal. The aggressor kernel may include a real component and an imaginary component. The aggressor signal received by the first radio access technology of the multi-technology communication device may be separated into a real component and an imaginary component. These components may be passed as inputs to a kernel function such as a harmonic or exponential function (e.g., a harmonic expansion), where the order of the kernel function may be dictated by information known about the transmission technology of the aggressor or victim signal. Alternatively, the entire aggressor signal may be passed to the kernel generator and the resulting kernel separated into a real component and an imaginary component. In either embodiment, the result of kernel function execution may be a two-element vector having an element representing the aggressor kernel real component and the aggressor kernel imaginary component.

In block 708, the multi-technology communication device may estimate the nonlinear interference of the victim signal caused by the aggressor signal(s). This estimation of the nonlinear interference is discussed in further detail (e.g., with reference to FIGS. 8 and 9). In block 710, the multi-technology communication device may cancel an estimated nonlinear interference signal from the victim signal. Canceling or removing the estimated nonlinear interference from the victim signal may be implemented in a variety of known ways, such as filtration, transformation, extraction, reconstruction, and suppression. In block 712, the multi-technology communication device may decode the victim signal without presence of the interference by the aggressor signal(s). In block 714, the multi-technology communication device may advance to the next time interval "i" (e.g., move to the current time interval) and begin the process again with regard to aggressor and victim signals for the current time "i".

Figure 8:
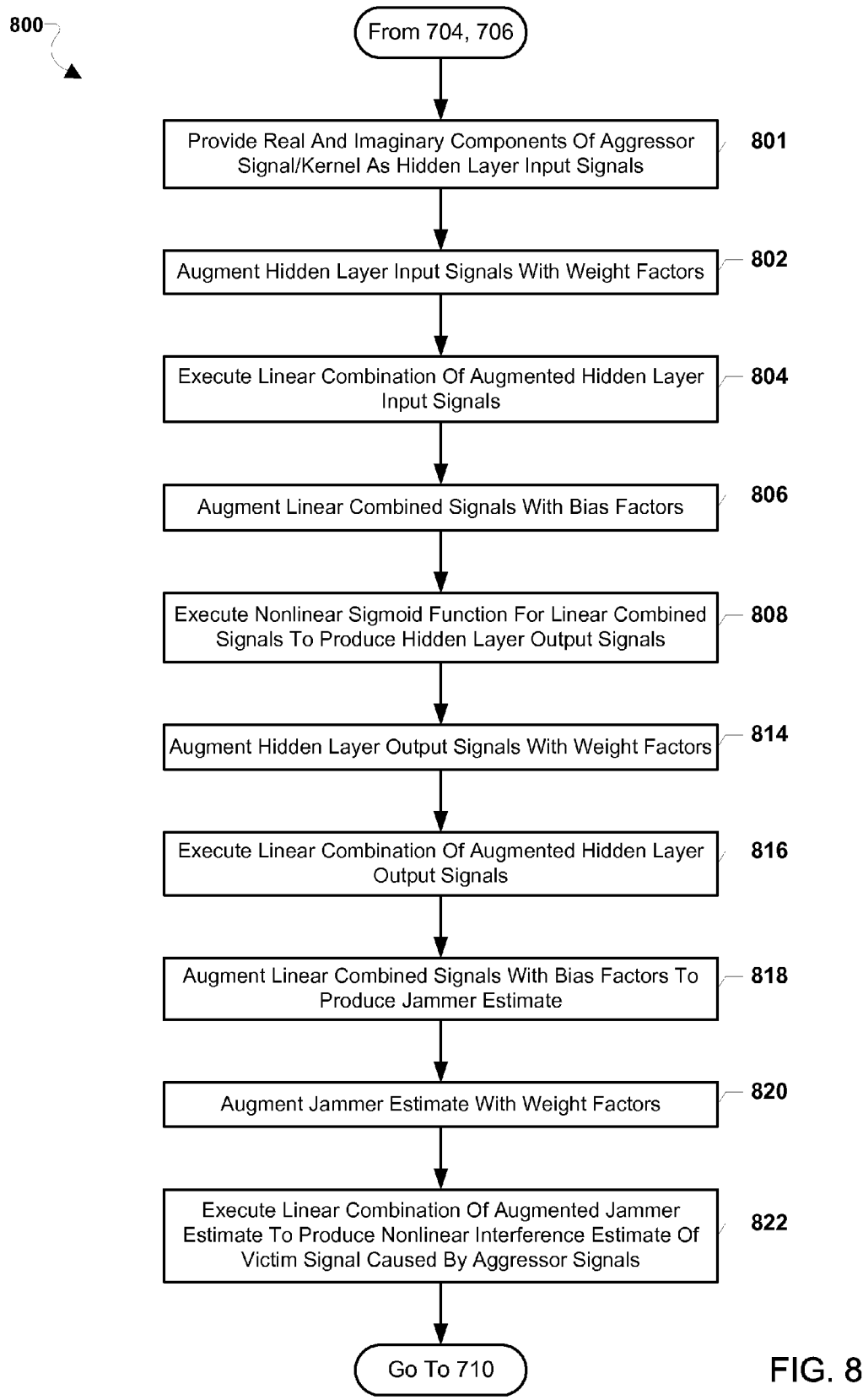
FIG. 8 is a process flow diagram illustrating a method for estimating nonlinear interference using a multilayer perceptron neural network with Hammerstein structure in a multi-technology wireless communications device in accordance with various embodiments.

FIG. 8 illustrates a method 800 for estimating nonlinear interference using a multilayer perceptron neural network with Hammerstein structure (e.g., 400 in FIG. 4) in a multi-technology wireless communications device in accordance with various embodiments. With reference to FIGS. 1-8, the method 800 may be executed in a computing device (e.g., 110, 120, 200) using software, general purpose or dedicated hardware, or a combination of software and hardware, such as the general purpose processor 206, baseband processor 216, or the like. In one example, the method may be performed by a processor of the multi-technology communication device. The method 800 may be included in method 700 in FIG. 7 as part of block 708. As described above, the victim signal and the aggressor signal or aggressor kernel may be used by the multi-technology communication device as input signals for the multilayer perceptron neural network with Hammerstein structure. The victim signal and the aggressor signal or aggressor kernel may be received by the input layer of the multilayer perceptron neural network. The aggressor signal or aggressor kernel may be divided into one or more real and imaginary components. The real and imaginary components of the aggressor signal or aggressor kernel may be used as hidden layer input signals and may be manipulated in the estimation of the estimated nonlinear interference.

In block 801, the multi-technology communication device may provide the real and imaginary components of the aggressor signal or the aggressor kernel as hidden layer input signals to the hidden layer of the single hidden layer multilayer perceptron neural network. In block 802 the multi-technology communication device may augment the hidden layer input signals with weight factors. As described above, in various embodiments, the weight factors may be determined at random, be preprogrammed, and/or trained as described with reference to FIG. 9.

In block 804, the multi-technology communication device may execute a linear combination of the hidden layer input signals augmented by the weight factors. In block 806, the multi-technology communication device may execute a linear combination of the linearly combined hidden layer input signals and a bias factor. In some embodiments, the bias factor may be a constant augmented by a weight factor. In some embodiments, the augmentation and linear combination may be executed through mathematical and/or logical operations. The operations implementing the augmentation may result in a multiplication of a respective weight factor with a respective hidden layer input signal. The operations implementing the linear combination may result in the summation of the augmented hidden layer input signals and the bias factor. The linear combination of the augmented hidden layer input signals and the bias factor may be labeled as the hidden layer intermediate signal.

In block 808, the multi-technology communication device may execute a nonlinear sigmoid function on the hidden layer intermediate signal to produce the hidden layer output signal. The nonlinear sigmoid function may include any known nonlinear sigmoid function, including a hyperbolic tangent function.

In block 814, the multi-technology communication device may augment the hidden layer output signals with the weight factors in block 814 in a similar manner to the operations in block 802 as described. In block 816, the multi-technology communication device may execute a linear combination of the hidden layer output signals augmented by the weight factors as described for the hidden layer input signals in block 804.

In block 818, the multi-technology communication device may augment the linearly combined hidden layer output signals with a bias factor, such as a constant augmented by a weight factor. In some embodiments, augmenting the combined hidden layer output signals with the bias factor may include executing a linear combination of the combined hidden layer output signals and the bias factor. Augmenting the combined hidden layer output signals with the bias factor may produce a jammer signal estimate. Blocks 816 and 818 may be executed for multiple groups of hidden layer output signals and multiple bias factors such that the linear combinations produce real and imaginary components of the jammer signal estimate.

In block 820, the multi-technology communication device may augment the real and imaginary components of the jammer signal estimate with weight factors at various iterations of the delay lines of a linear filter function. The weight factors may be used to augment the real and imaginary components of the jammer signal estimate in a similar manner to the operations in block 802 as described. In block 822, the multi-technology communication device may execute a linear combination of each instance of the augmented real and imaginary components of the jammer signal estimate, as they pass through respective delay lines of the linear filter function. In other words, the multi-technology communication device may execute a linear combination of the various instances of the augmented real components of the jammer signal estimate separately from the linear combination of the augmented imaginary components of the jammer signal estimate. Each linear combination of the augmented real and imaginary components of the jammer signal estimate may respectively produce a real and an imaginary component of an estimated nonlinear interference on the victim signal caused by the aggressor signal. The real estimated nonlinear interference component may result from the linear combination of the augmented real components of the jammer signal estimate. Similarly, the imaginary estimated nonlinear interference component may result from the linear combination of the augmented imaginary components of the jammer signal estimate. The estimated real and imaginary nonlinear interference components may be combined to create an estimated nonlinear interference signal of the victim signal caused by the aggressor signal.

Figure 9:
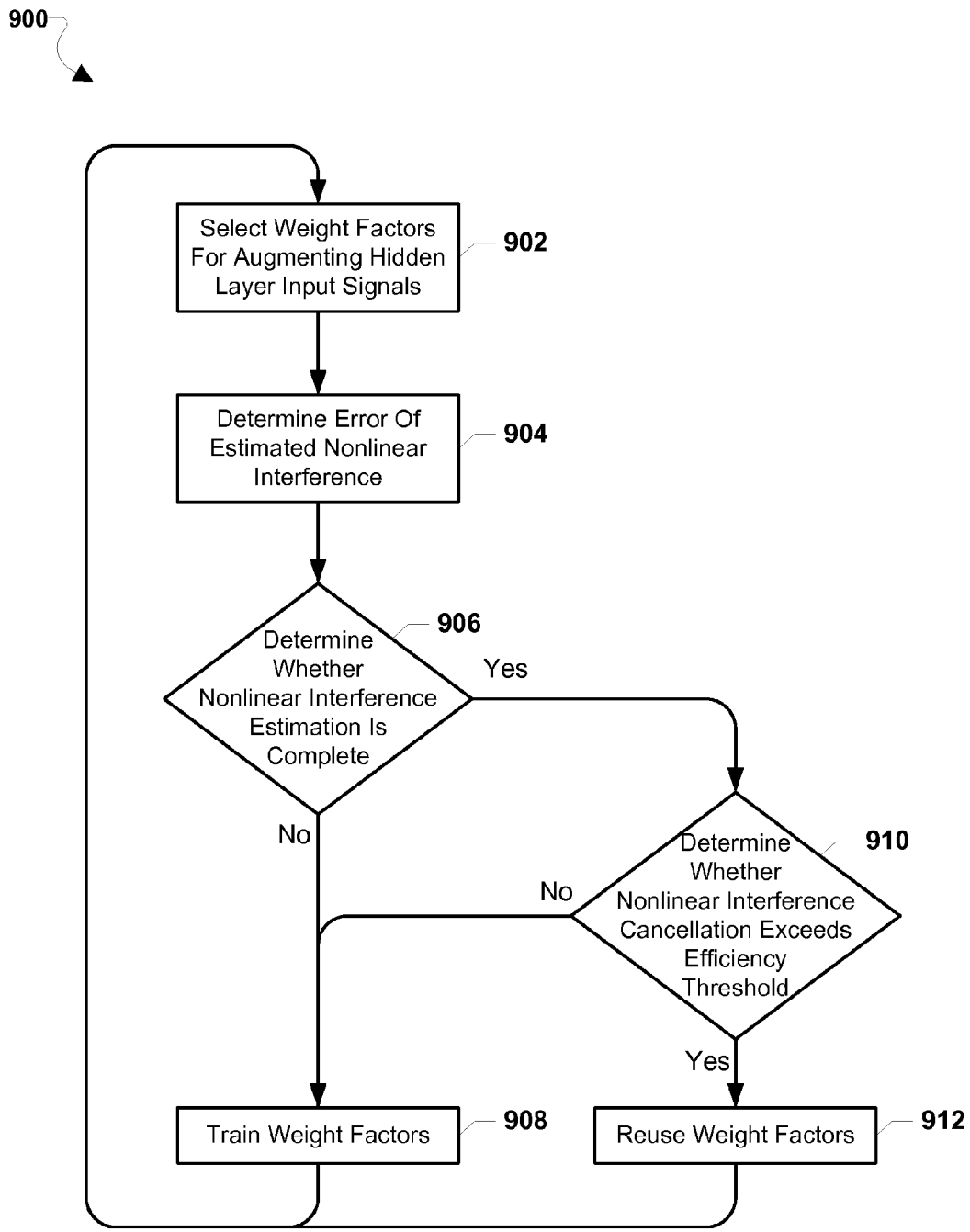
FIG. 9 is a process flow diagram illustrating a method for training weight factors for use in a multilayer perceptron neural network with Hammerstein structure in a multi-technology wireless communications device in accordance with various embodiments.

FIG. 9 illustrates a method 900 for training weight factors for use in a multilayer perceptron neural network with Hammerstein structure (e.g., 400 in FIG. 4) in a multi-technology wireless communications device in accordance with various embodiments. With reference to FIGS. 1-9, the method 900 may be executed in a computing device (e.g., 110, 120, 200) using software, general purpose or dedicated hardware, or a combination of software and hardware, such as the general purpose processor 206, baseband processor 216, or the like. In one example, the method may be performed by a processor of the multi-technology communication device. In block 902, the multi-technology communication device may select the weight factors for augmenting the hidden layer input signals. As described, in various embodiments, the weight factors may be determined at random, be preprogrammed, and/or trained. The weight factors may be selected from a range of values configured to reduce the error of the estimated nonlinear interference. A non-limiting example range includes values of about −0.5 to about 0.5.

In block 904, the multi-technology communication device may determine an error present in the estimate of the nonlinear interference. Various known methods for determining the error of a function may be used to determine the error in block 904. In some embodiments, the error calculation may be for the mean square error of the estimated nonlinear interference compared with the nonlinear interference signal caused by the aggressor signal(s).

In determination block 906, the multi-technology communication device may determine whether the estimation of the nonlinear interference is complete. Estimation of the nonlinear interference may be considered to be complete at such time as the multilayer perceptron neural network with Hammerstein structure has finished execution and an estimated nonlinear interference signal has been obtained (i.e., the real and imaginary estimated nonlinear interference have been combined). In response to determining that the estimation of the nonlinear interference is incomplete (i.e., determination block 906="No"), the multi-technology communication device may train the weight factors in block 908. In various embodiments, the weight factors may be trained using a variety of optimization algorithms, for example gradient decent, the Gauss-Newton algorithm, and the Levenberg-Marquardt algorithm. Training of the weight factors may be regressively executed to further reduce the error of the estimated nonlinear interference. Weight factors for each node of each layer of the multilayer perceptron neural network may be trained. Each weight factor may depend on the node and layer from which the hidden layer input signal originates and terminates. In other words, each weight for augmenting a hidden layer input signal may be trained using the previous weight factor for augmenting a hidden layer input signal originating from a same first node and first layer, and being provided to a same second node and second layer. The multi-technology communication device may continue selecting weight factors for augmenting the hidden layer inputs signals in block 902 and may select any combination of reused, newly added, or additionally trained weight factors.

In response to determining that the estimation of the nonlinear interference is complete (i.e., determination block 906="Yes"), the multi-technology communication device may determine whether the nonlinear interference cancellation exceeds an efficiency threshold in determination block 910. The determination of whether the nonlinear interference cancellation exceeds the efficiency threshold may be a measure of whether the nonlinear interference is cancelled sufficient to enable the multi-technology communication device to decode and use the victim signal. The efficiency threshold may be a precalculated or predetermined value based on historical observations of a level of accuracy present in an estimated nonlinear interference signal that is necessary to enable proper decoding of a victim signal. In some embodiments, the efficiency threshold may be based on the error value determination of the nonlinear interference in block 904, in which the error level may be compared to an acceptable error level. In some embodiments, the efficiency threshold may be based on a success rate for decoding and using the victim signal. In response to determining that the nonlinear interference cancellation does not exceed the efficiency threshold (i.e., determination block 910="No"), the multi-technology communication device may continue to train the weight factors in block 908. Training the weight factors may reduce the amount of error in the estimated nonlinear interference so that the cancellation of the estimated nonlinear interference may result in greater success of decoding and using the victim signal.

In response to determining that the nonlinear interference cancellation does exceed the efficiency threshold (i.e., determination block 910="Yes"), the multi-technology communication device may reuse the weight factors for subsequent estimation and cancellation of nonlinear interference in block 912. As described, the multi-technology communication device may not always train the weight factors when estimating the nonlinear interference. The nonlinear interference caused by the one or more aggressor signals may vary by different amounts under various conditions. In some embodiments, the variation in the nonlinear interference may be small enough that the previously trained weight factors may result in a sufficiently accurate estimated nonlinear interference that further training is unnecessary. Determining when to train the weight factors or reuse the weight factors may be based on one or more criteria, including time, measurements of the aggressor signal(s), victim signal quality, and nonlinear interference noise cancellation efficiency, for example including error of the estimated nonlinear interference and/or success of decoding and using the victim signal.

In some embodiments, the method 900 may be executed at various times before, during, or after the execution of the method 700 and the method 800. For example, the method 900 may be executed to calculate at least some of the weight factors before they are used to augment the hidden layer input signals in blocks 804 and 816. In some embodiments, certain blocks of the method 900 the method may not execute contiguously, but may instead execute interspersed with the blocks of the methods 700, 800.

In some embodiments, the method 900 may also be executed for the bias factors in place of or in addition to the weight factors. In some embodiments, the bias factors may be included in the weight factors.

In other words, the methods may manage interference such as signal interference (e.g., non-linear interference) that is present in a signal received in a multi-technology communication device. Managing or analyzing interference may include filtering a received aggressor signal using a multilayer perceptron neural network with Hammerstein structure. The multi-layer perceptron neural network may include a number of layers (input layer, hidden layer, output layer, etc.) in which different mathematical operations are executed, thereby extracting a numerical representation of estimated interference from the received aggressor signal. The multi-technology communication device may receive an aggressor signal (i.e., a signal interfering with or impeding another received signal) at an input layer of the multi-layer perceptron neural network. The multi-technology communication device may divide the aggressor signal into a real aggressor signal component and an imaginary aggressor signal component (i.e., elements represented by real numbers and elements represented by imaginary numbers). The multi-technology communication device may augment the real aggressor signal component and the imaginary aggressor signal components with weight factors (weights, weighting components) at a hidden layer of the multi-layer perceptron neural network. Augmentation may include multiplying each element of the real and imaginary aggressor signal components by a corresponding weight element (i.e., a multiplier). The multi-technology communication device may linearly combine, sum, or add the real aggressor signal component and the imaginary aggressor signal component at the hidden layer to produce a hidden layer intermediate signal. The multi-technology communication device may execute a nonlinear sigmoidal function on the hidden layer intermediate signals to produce hidden layer outputs. The hidden layer output signals may be augmented, such as by augmenting the hidden layer output signals with weight factors, which may be the same or different weight factors from those used in the hidden layer augmentation. The multi-technology communication device may linearly combine the hidden layer output signals at an output layer of the multi-layer perceptron neural network to produce a real output layer output signal and an imaginary output layer output signal. The multi-technology communication device may execute a linear filter function, FIR filter, finite impulse response filter, or Hammerstein structure on both a real output layer output signal and an imaginary output layer output signal at an output layer of the multi-layer perceptron filtering construct to obtain estimated nonlinear interference. A result of the filtering/extracting may be an estimated interference (estimated nonlinear interference, estimated interference signal), which may be subtracted from the received victim signal (i.e., the signal subject to interference by the aggressor signal) to produce a mathematical representation of the intended received signal.

Figure 10:
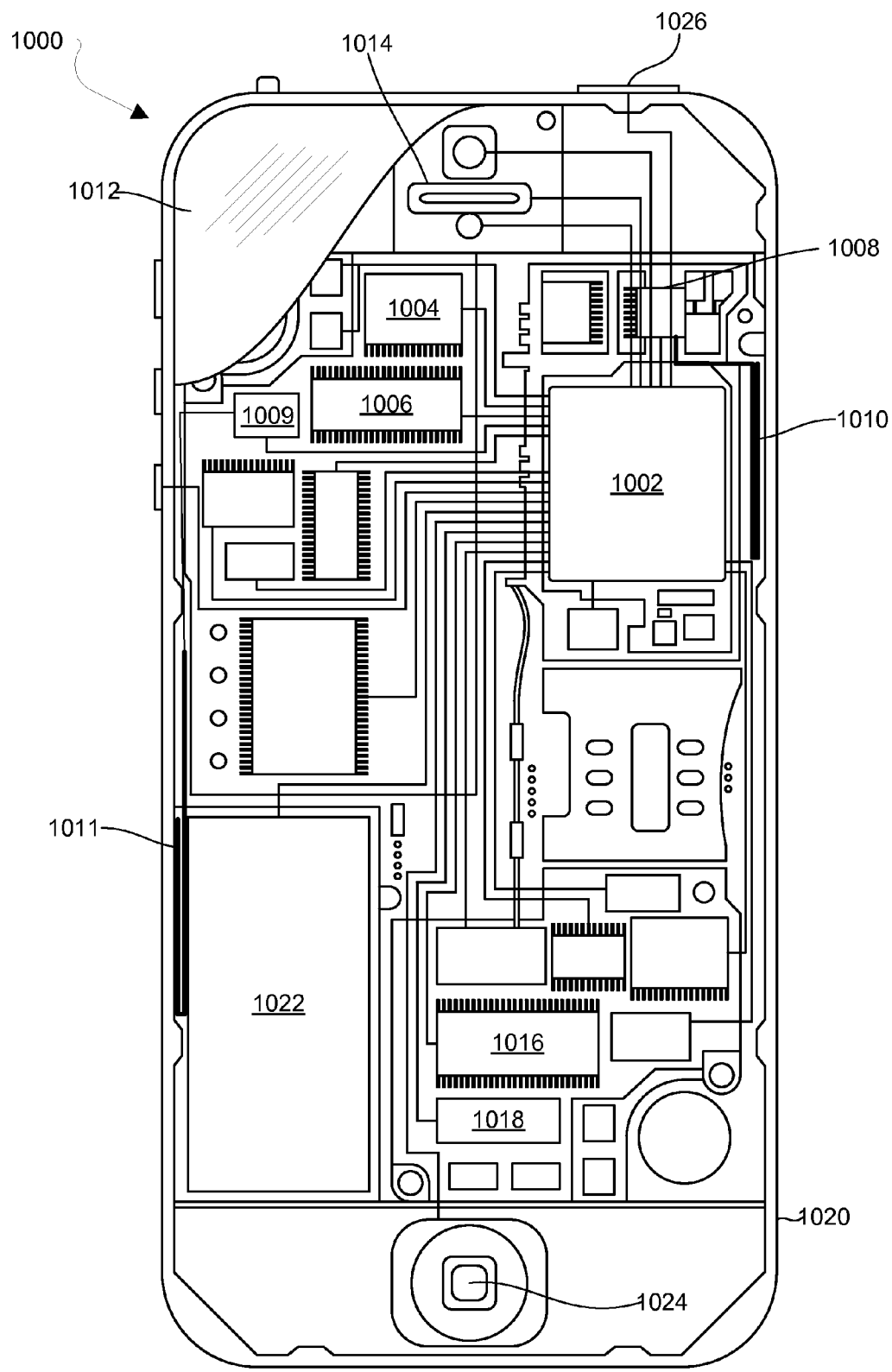
FIG. 10 is a component diagram of an example multi-technology wireless communication device suitable for use with various embodiments.

FIG. 10 illustrates an exemplary multi-technology communication device 1000 suitable for use with the various embodiments. The multi-technology communication device 1000 may be similar to the multi-technology device 110, 120, 200 (e.g., FIGS. 1 and 2). With reference to FIGS. 1-10, the multi-technology communication device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the multi-technology communication device 1000 need not have touch screen capability.

The multi-technology communication device 1000 may have two or more cellular network transceivers 1008, 1009 coupled to antennae 1010, 1011, for sending and receiving communications via a cellular communication network. The combination of the transceiver 1008 or 1009 and the associated antenna 1010 or 1011, and associated components, is referred to herein as a radio frequency (RF) chain. The cellular network transceivers 1008, 1009 may be coupled to the processor 1002, which is configured with processor-executable instructions to perform operations of the embodiment methods described above. The cellular network transceivers 1008, 1009 and antennae 1010, 1011 may be used with the above-mentioned circuitry to implement the various wireless transmission protocol stacks and interfaces. The multi-technology communication device 1000 may include one or more cellular network wireless modem chips 1016 coupled to the processor and the cellular network transceivers 1008, 1009 and configured to enable communication via cellular communication networks.

The multi-technology communication device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as USB, FireWire, Thunderbolt, or PCIe. The peripheral device connection interface 1018 may also be coupled to a similarly configured peripheral device connection port (not shown).

The multi-technology communication device 1000 may also include speakers 1014 for providing audio outputs. The multi-technology communication device 1000 may also include a housing 1020, constructed of a plastic, metal, or a combination of materials, for containing all or some of the components discussed herein. The multi-technology communication device 1000 may include a power source 1022 coupled to the processor 1002, such as a disposable or rechargeable battery. The rechargeable battery may also be coupled to the peripheral device connection port to receive a charging current from a source external to the multi-technology communication device 1000. The multi-technology communication device 1000 may also include a physical button 1024 for receiving user inputs. The multi-technology communication device 1000 may also include a power button 1026 for turning the multi-technology communication device 1000 on and off.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present claims. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A method for managing interference in a multi-technology communication device, comprising:

receiving an aggressor signal at the multi-technology communication device;

dividing the aggressor signal into a real aggressor signal component and an imaginary aggressor signal component;

augmenting the real aggressor signal component and the imaginary aggressor signal components with weight factors at a hidden layer of a multilayer perceptron neural network;

executing a first linear combination of the real aggressor signal component and the imaginary aggressor signal component at the hidden layer to produce a hidden layer intermediate signal;

executing a nonlinear sigmoid function for the hidden layer intermediate signal at the hidden layer to produce a hidden layer output signal;

augmenting, a plurality of the hidden layer output signals each with the weight factors at an output layer of the multilayer perceptron neural network;

executing a second linear combination of the augmented plurality of hidden layer output signals at the output layer to produce a real output layer output signal and an imaginary output layer output signal; and executing a linear filter function on the real output layer output signal and the imaginary output layer output signal to produce an estimated real nonlinear interference and an estimated imaginary nonlinear interference.

2. The method of claim 1, further comprising:

combining the estimated real nonlinear interference and the estimated imaginary nonlinear interference to produce an estimated nonlinear interference;

determining an error of the estimated nonlinear interference;

determining whether the error of the estimated nonlinear interference exceeds an efficiency threshold; and canceling the estimated nonlinear interference from a victim signal.

3. The method of claim 2, wherein canceling the estimated nonlinear interference from the victim signal comprises canceling the estimated nonlinear interference from the victim signal in response to determining that the error of the estimated nonlinear interference does not exceed the efficiency threshold, the method further comprising training the weight factors to reduce the error of the estimated nonlinear interference in response to determining that the error of the estimated nonlinear interference exceeds the efficiency threshold.

4. The method of claim 3, wherein training the weight factors to reduce the error of the estimated nonlinear interference comprises using a Gauss-Newton algorithm to train the weight factors.

5. The method of claim 2, further comprising selecting the weight factors to reduce the error of the estimated nonlinear interference.

6. The method of claim 5, wherein selecting the weight factors to reduce the error of the estimated nonlinear interference comprises selecting the weight factors used for a previous determination of a previous estimated nonlinear interference for a previous victim signal within a predetermined time period.

7. The method of claim 1, wherein the linear filter function is a finite impulse response filter.

8. The method of claim 1, wherein the linear filter function has a Hammerstein structure.

9. The method of claim 1, wherein dividing the aggressor signal into the real aggressor signal component and the imaginary aggressor signal component comprises generating an aggressor kernel such that the real aggressor signal component is a real aggressor kernel component and the imaginary aggressor signal component is an imaginary aggressor kernel component.

10. The method of claim 9, wherein the aggressor kernel is a set of non-linear inputs derived from the aggressor signal.

11. The method of claim 1, wherein executing the first linear combination of the real aggressor signal component and the imaginary aggressor signal component at the hidden layer comprises executing a linear combination of the real aggressor signal component, the imaginary aggressor signal component, and a bias factor at the hidden layer.

12. The method of claim 1, wherein executing the second linear combination of the augmented hidden layer output signals at the output layer to produce the real output layer output signal and the imaginary output layer output signal comprises executing a linear combination of the augmented hidden layer output signals and a bias factor at the output layer.

13. The method of claim 1, wherein executing the linear filter function on the real output layer output signal and the imaginary output layer output signal to produce the estimated real nonlinear interference and the estimated imaginary nonlinear interference comprises:
augmenting the real output layer output signals and the imaginary output layer output signal each with the weight factors at a plurality of instances corresponding to a number of taps of the a linear filter function to produce augmented real output layer output signals and augmented imaginary output layer output signals;
executing a third linear combination of the augmented real output layer output signals to produce the estimated real nonlinear interference; and
executing a fourth linear combination of the augmented imaginary output layer output signals to produce the estimated imaginary nonlinear interference.

14. A multi-technology communication device, comprising:
an antenna;
a processor communicatively connected to the antenna and configured with processor-executable instructions to perform operations comprising:
dividing an aggressor signal received via the antenna into a real aggressor signal component and an imaginary aggressor signal component;
augmenting the real aggressor signal component and the imaginary aggressor signal component with weight factors at a hidden layer of a multilayer perceptron neural network;
executing a first linear combination of the real aggressor signal component and the imaginary aggressor signal component at the hidden layer to produce a hidden layer intermediate signal;
executing a nonlinear sigmoid function for the hidden layer intermediate signal at the hidden layer to produce a hidden layer output signal;
augmenting a plurality of the hidden layer output signals each with the weight factors at an output layer of the multilayer perceptron neural network;
executing a second linear combination of the augmented plurality of hidden layer output signals at the output layer to produce a real output layer output signal and an imaginary output layer output signal; and
executing a linear filter function on the real output layer output signal and the imaginary output layer output signal to produce an estimated real nonlinear interference and an estimated imaginary nonlinear interference.

15. The multi-technology communication device of claim 14, wherein the processor is configured with processor-executable instructions to perform operations further comprising:
combining the estimated real nonlinear interference and estimated imaginary nonlinear interference to produce an estimated nonlinear interference;
determining an error of the estimated nonlinear interference;
determining whether the error of the estimated nonlinear interference exceeds an efficiency threshold; and
canceling the estimated nonlinear interference from a victim signal.

16. The multi-technology communication device of claim 15, wherein the processor is configured with processor-executable instructions to perform operations comprising:
canceling the estimated nonlinear interference from the victim signal in response to determining that the error of the estimated nonlinear interference does not exceed the efficiency threshold; and
training the weight factors to reduce the error of the estimated nonlinear interference in response to determining that the error of the estimated nonlinear interference exceeds the efficiency threshold.

17. The multi-technology communication device of claim 16, wherein the processor is configured with processor-executable instructions to perform operations such that training the weight factors to reduce the error of the estimated nonlinear interference comprises training the weight factors using a Gauss-Newton algorithm.

18. The multi-technology communication device of claim 15, wherein the processor is configured with processor-executable instructions to perform operations comprising selecting the weight factors to reduce the error of the estimated nonlinear interference.

19. The multi-technology communication device of claim 18, wherein the processor is configured with processor-executable instructions to perform operations such that selecting the weight factors to reduce the error of the estimated nonlinear interference comprises selecting the weight factors used for a previous determination of a previous estimated nonlinear interference for a previous victim signal within a predetermined time period.

20. The multi-technology communication device of claim 14, wherein the processor is configured with processor-executable instructions to perform operations such that executing the linear filter function on the real output layer output signal and the imaginary output layer output signal to produce the estimated real nonlinear interference and the estimated imaginary nonlinear interference comprises using a finite impulse response filter on the real output layer output signal and the imaginary output layer output signal to produce the estimated real nonlinear interference and the estimated imaginary nonlinear interference.

21. The multi-technology communication device of claim 14, wherein the processor is configured with processor-executable instructions to perform operations such that executing the linear filter function on the real output layer output signal and the imaginary output layer output signal to produce the estimated real nonlinear interference and the estimated imaginary nonlinear interference comprises using the linear filter function with a Hammerstein structure on the real output layer output signals and the imaginary output layer output signals to produce the estimated real nonlinear interference and the estimated imaginary nonlinear interference.

22. The multi-technology communication device of claim 14, wherein the processor is configured with processor-executable instructions to perform operations such that dividing the aggressor signal into the real aggressor signal component and the imaginary aggressor signal component comprises generating an aggressor kernel such that the real aggressor signal component is a real aggressor kernel component and the imaginary aggressor signal component is an imaginary aggressor kernel component.

23. The multi-technology communication device of claim 22, wherein the processor is configured with processor-executable instructions to perform operations such that generating the aggressor kernel such that the real aggressor signal component is the real aggressor kernel component and the imaginary aggressor signal component is the imaginary aggressor kernel component comprises generating the aggressor kernel as a set of non-linear inputs derived from the aggressor signal.

24. The multi-technology communication device of claim 14, wherein the processor is configured with processor-executable instructions to perform operations such that executing the first linear combination of the real aggressor signal component and the imaginary aggressor signal component at the hidden layer comprises executing a linear combination of the real aggressor signal component and the imaginary aggressor signal components and a bias factor at the hidden layer.

25. The multi-technology communication device of claim 14, wherein the processor is configured with processor-executable instructions to perform operations such that executing the second linear combination of the augmented hidden layer output signals at the output layer to produce the real output layer output signal and the imaginary output layer output signal comprises executing a linear combination of the augmented hidden layer output signals and a bias factor at the output layer.

26. The multi-technology communication device of claim 14, wherein the processor is configured with processor-executable instructions to perform operations such that executing the linear filter function on the real output layer output signal and the imaginary output layer output signal to produce the estimated real nonlinear interference and the estimated imaginary nonlinear interference comprises:
augmenting the real output layer output signal and the imaginary output layer output signal each with the weight factors at a plurality of instances corresponding to a number of taps of the a linear filter function to produce augmented real output layer output signals and augmented imaginary output layer output signals;
executing a third linear combination of the augmented real output layer output signals to produce the estimated real nonlinear interference; and
executing a fourth linear combination of the augmented imaginary output layer output signals to produce the estimated imaginary nonlinear interference.

27. A multi-technology communication device, comprising:
means for receiving an aggressor signal at the multi-technology communication device;
means for dividing the aggressor signal into a real aggressor signal component and an imaginary aggressor signal component;
means for augmenting the real aggressor signal component and the imaginary aggressor signal component with weight factors at a hidden layer of a multilayer perceptron neural network;
means for executing a first linear combination of the real aggressor signal component and the imaginary aggressor signal component at the hidden layer to produce a hidden layer intermediate signal;
means for executing a nonlinear sigmoid function for the hidden layer intermediate signal at the hidden layer to produce a hidden layer output signal;
means for augmenting a plurality of the hidden layer output signals each with the weight factors at an output layer of the multilayer perceptron neural network;
means for executing a second linear combination of the augmented plurality of hidden layer output signals at the output layer to produce a real output layer output signal and an imaginary output layer output signal; and
means for executing a linear filter function on the real output layer output signal and the imaginary output layer output signal to produce an estimated real nonlinear interference and an estimated imaginary nonlinear interference.

28. A non-transitory processor-readable medium having stored thereon processor executable instructions to cause a processor of a multi-technology communication device to perform operations comprising:
dividing an aggressor signal into a real aggressor signal component and an imaginary aggressor signal component;
augmenting the real aggressor signal component and the imaginary aggressor signal component with weight factors at a hidden layer of a multilayer perceptron neural network;
executing a first linear combination of the real aggressor signal component and the imaginary aggressor signal component at the hidden layer to produce a hidden layer intermediate signal;
executing a nonlinear sigmoid function for the hidden layer intermediate signal at the hidden layer to produce a hidden layer output signal;
augmenting a plurality of the hidden layer output signals each with the weight factors at an output layer of the multilayer perceptron neural network;
executing a second linear combination of the augmented plurality of hidden layer output signals at the output layer to produce a real output layer output signal and an imaginary output layer output signal; and
executing a linear filter function on the real output layer output signal and the imaginary output layer output signals to produce an estimated real nonlinear interference and an estimated imaginary nonlinear interference.

29. The non-transitory processor-readable medium of claim 28, wherein the stored processor executable instructions are configured to cause the processor of the multi-technology communication device to perform operations further comprising:
combining, by the processor, the estimated real nonlinear interference and estimated imaginary nonlinear interference to produce an estimated nonlinear interference;
determining, by the processor, an error of the estimated nonlinear interference;

determining, by the processor, whether the error of the estimated nonlinear interference exceeds an efficiency threshold; and canceling, by the processor, the estimated nonlinear interference from a victim signal.

30. The non-transitory processor-readable medium of claim 29, wherein:

the stored processor executable instructions are configured to cause the processor of the multi-technology communication device to perform operations such that canceling the estimated nonlinear interference from the victim signal comprises canceling the estimated nonlinear interference from the victim signal in response to determining that the error of the estimated nonlinear interference does not exceed the efficiency threshold; and the stored processor executable instructions are configured to cause the processor of the multi-technology communication device to perform operations further comprising training the weight factors to reduce the error of the estimated nonlinear interference in response to determining that the error of the estimated nonlinear interference exceeds the efficiency threshold.

* * * * *